United States Patent
Ephan, Jr. et al.

(10) Patent No.: US 9,528,634 B2
(45) Date of Patent: Dec. 27, 2016

(54) AGRICULTURAL TUBING EXTRACTOR AND RELATED METHODS

(71) Applicant: Syngenta Participations AG, Basel (SZ)

(72) Inventors: Lawrence A. Ephan, Jr., Kalaheo, HI (US); Craig A. Spielman, Sacramento, CA (US); Daniel E. Larson, Slater, IA (US); Kevin W. Meier, Slater, IA (US)

(73) Assignee: Syngenta Participations AG, Basel (CH)

( * ) Notice: Subject to any disclaimer, the term of this patent is extended or adjusted under 35 U.S.C. 154(b) by 759 days.

(21) Appl. No.: 13/646,348

(22) Filed: Oct. 5, 2012

(65) Prior Publication Data

US 2013/0115005 A1    May 9, 2013

Related U.S. Application Data

(60) Provisional application No. 61/544,828, filed on Oct. 7, 2011.

(51) Int. Cl.
| | |
|---|---|
| *F16L 1/032* | (2006.01) |
| *A01G 25/00* | (2006.01) |
| *B65H 57/14* | (2006.01) |

(52) U.S. Cl.
CPC ............... *F16L 1/032* (2013.01); *A01G 25/00* (2013.01); *B65H 57/14* (2013.01); *B65H 2701/33* (2013.01)

(58) Field of Classification Search
CPC ..................................................... F16L 1/032
USPC ........ 171/1, 10, 45; 47/9; 242/403, 557, 919
See application file for complete search history.

(56) References Cited

U.S. PATENT DOCUMENTS

| | | |
|---|---|---|
| 3,739,985 A | 6/1973 | Odom et al. |
| 3,995,355 A | 12/1976 | Sneed et al. |
| 4,148,445 A | 4/1979 | Reynolds et al. |
| 4,253,619 A * | 3/1981 | Corderoy et al. ......... 242/390.6 |
| 4,586,677 A | 5/1986 | Nevarez |
| 4,830,283 A | 5/1989 | Johnson |
| 5,190,409 A | 3/1993 | Hall |
| 5,297,898 A | 3/1994 | Wuertz |
| 5,366,023 A | 11/1994 | Souza |

(Continued)

FOREIGN PATENT DOCUMENTS

WO    WO2013/052857    4/2013

OTHER PUBLICATIONS

"Drip Tape Extractor Sled," Andros Engineering <http://www.andros-engineering.com/ext-drip-tape-extractor-sled.html> (Accessed Apr. 6, 2011).

(Continued)

*Primary Examiner* — Sunil Singh
(74) *Attorney, Agent, or Firm* — Jenkins, Wilson, Taylor & Hunt

(57) ABSTRACT

An extractor for removing agricultural tubing from soil of a field and related methods are provided. The extractor includes a frame and a pivot frame disposed on the frame. The pivot frame can have a pivot axis around which at least a portion of the pivot frame is pivotal. The extractor can include a first roller secured to the frame and a second roller secured to the pivot frame that is moveable by the pivot frame with the first roller being positioned closer to the soil than the second roller so that a tubing to be extracted is threadable under the first roller and over the second roller.

39 Claims, 19 Drawing Sheets

(56) References Cited

U.S. PATENT DOCUMENTS

| | | | |
|---|---|---|---|
| 5,454,431 A | 10/1995 | Ledwig | |
| 5,522,699 A | 6/1996 | Smith | |
| 6,174,104 B1 * | 1/2001 | Fields | 404/94 |
| 6,561,731 B1 | 5/2003 | Clare et al. | |
| 6,764,039 B1 * | 7/2004 | James, Jr. | A01G 13/0287 |
| | | | 242/403 |
| 7,566,024 B2 | 7/2009 | Krise et al. | |
| 2003/0129043 A1 | 7/2003 | Clare et al. | |
| 2004/0200363 A1 | 10/2004 | Andersen et al. | |
| 2007/0094925 A1 | 5/2007 | Andersen et al. | |

OTHER PUBLICATIONS

"RO-DRIP User Manual," Roberts Irrigation Products, Inc. (101 pages) (2001).

Burt, "Surface Drip Tape Irrigation Systems as an Alternative to SDI for Field and Row Crops," 7$^{th}$ ICID MicroIrrigation Congress, Kuala Lumpur, Malaysia. Sep. 13-15, 2006 (12 pages).

Zhu et al., "An Implement to Install and Retrieve Surface Drip Irrigation Laterals," Applied Engineering in Agriculture. vol. 20, No. 1 pp. 17-23 (2004).

Notification of Transmittal of the International Search Report and the Written Opinion of the International Searching Authority, or the Declaration corresponding to International Patent Application No. PCT/US2012/059040 dated Jan. 11, 2013.

Notification Concerning Transmittal of International Preliminary Report on Patentability (Chapter I of The Patent Cooperation Treaty) corresponding to International Patent Application No. PCT/US2012/059040 dated Apr. 17, 2014.

* cited by examiner

US 9,528,634 B2

AGRICULTURAL TUBING EXTRACTOR AND RELATED METHODS

RELATED APPLICATIONS

This application claims priority to U.S. Provisional Patent Application Ser. No. 61/544,828, filed Oct. 7, 2011, which is herein incorporated in its entirety.

TECHNICAL FIELD

The subject matter disclosed herein relates generally to agricultural tubing extractors and, more particularly, to extractors and related methods used for removing agricultural tubing such as irrigation tubing, or drip tape, from soil in a field.

BACKGROUND

From the perspective of a grower or farmer, profitability is partly a function of crop yield, where crop output is maximized relative to input costs. Incentives are also an important part of profitability, where a grower is able to produce a crop meeting preset quality criteria. From a processing and packing perspective, final end product often defines the desired size and shape of raw product. One way to improve crop yield to insure proper amounts of moisture is provided to the crops, for example, through an irrigation system.

Agricultural irrigation systems have been used for centuries to apply water to agricultural crops. One relatively recent type of irrigation system that has developed is drip irrigation. In drip irrigation, water flows at a low pressure (e.g., typically 5 to 15 psi) through flattened tubing that is buried in the ground and the water is discharged through openings in the tubing in close proximity to the root systems of the plants. The water exits at a low pressure from the flattened tubing, which is also referred to as a "drip tape." A supply header receives water from a water pump and a plurality of the drip tubings, or tapes, are coupled with the supply header in a network of drip tubings corresponding to the particular shape of the field. A drip irrigation system as described above has the advantages of among others directly delivering water and nutrients to an area in close proximity to the root systems of the plants which maximizes plant growth and production, while limiting problems associated with other types of irrigation systems, such as erosion, disease, weed growth, soil saturation, energy costs and water conservation.

While the drip irrigation can be beneficial, the tubing that is buried in the field has a tendency to deteriorate and must be removed from a field at least periodically. For example, the buried tubing can be removed before the next planting cycle in the respective field occurs. The buried tubing used in drip irrigation, however, can be hard to extract from the soil in which it is embedded. It has a tendency to break if too much tension or pressure is placed upon it. Therefore, a need exists for a mechanism that can facilitate the removal of drip tubing from the soil of a field after the usefulness of the tubing has ended.

SUMMARY

In accordance with this disclosure, novel agricultural tubing extractors and related methods are provided. In particular, extractors and related methods are provided that can be used for removing agricultural tubing, such as irrigation tubing, or drip tape, from soil in a field.

In some embodiments, disclosed is an extractor for removing agricultural tubing from soil of a field, the extractor comprising: a frame; a pivot frame disposed on the frame, the pivot frame having a pivot axis around which at least a portion of the pivot frame is pivotal; a first roller secured to the frame; and a second roller secured to the pivot frame so that the second roller is movable by pivoting the pivot frame about the pivot axis to form an angle as measured from a plane between the first and second rollers and a plane approximately parallel with a surface of the soil with the first roller positioned closer to the soil than the second roller so that a tubing to be extracted is threadable under the first roller and over the second roller.

In some embodiments, the frame comprises a top surface and a bottom surface, the first roller being positionable below the bottom surface of the frame and the second roller being positionable above the top surface of the frame. In some embodiments, the frame comprises at least one wheel and a hitch to permit the frame to be pulled by a vehicle. In some embodiments, the extractor comprises a locking element that is engageable with the pivot frame to lock the pivot frame at different angles with the first roller positioned closer to the soil than the second roller.

In some embodiments, the angle as measured from a plane between the first and second rollers and a plane approximately parallel with a surface of the soil is determined based on at least one of a depth at which the tubing is buried in the soil, conditions of the soil, or a composition of the soil. In some embodiments, the angle as measured from a plane between the first and second rollers and a plane approximately parallel with a surface of the soil is approximately 45°. In some embodiments, the angle as measured from a plane between the first and second rollers and a plane approximately parallel with a surface of the soil is greater than approximately 45°.

In some embodiments, the frame comprises a first side and a second side and the pivot frame comprises a first arm attached to the first side of the frame and a second arm attached to the second side of the frame creating the pivot axis among the first and second arms and the frame. In some embodiments, the first roller is positioned between the first and second arms on the first side of the pivot axis and the second roller is positioned between the first and second arms on the second opposite side of the pivot axis. In some embodiments, the second roller is positioned between the first and second arms and the pivot axis is formed by attaching the first and second arms of the pivot frame to the frame inside of the position of the first roller such that the pivot axis is in front of the first roller in a direction of travel during use of the extractor. In some embodiments, the second roller is positioned in a location outside of the first roller such that the second roller is behind the first roller with the second roller following the first roller in the direction of travel.

In some embodiments, the frame comprises a first side and a second side and the pivot frame comprises a first upper arm and first lower arm attached to the first side of the frame and a second upper arm and second lower arm attached to the second side of the frame with the first upper arm and the second upper arm being pivotal about the pivot axis. In some embodiments, the first roller is positioned between the first and second lower arms and the second roller is positioned between the first and second upper arms with the first and second lower arms being stationary. In some embodiments, the first roller is adjustable along the first and second lower arms of the pivot frame. In some embodiments, the extractor comprises a controller for pivoting the pivot frame about the pivot axis.

In some embodiments, the first roller is positioned in the pivot frame and at least one of the first and second rollers are adjustable along the pivot frame relative to the pivot axis. In some embodiments, the second roller is adjustable along the pivot frame relative to the pivot axis to adjust a distance between the first roller and the second roller. In some embodiments, the extractor comprises a third roller positionable within the frame between the first and second rollers.

In some embodiments, the first, second and third rollers are positioned relative to one another so that a tubing to be extracted is threadable under the first roller and over the third and second rollers in an s-curve with the tubing being approximately linear between the third roller and the second roller. In some embodiments, the third roller is positioned in and is adjustable along the pivot frame between the first roller and the second roller to adjust at least one of a distance between the first roller and the third roller or a distance between the second roller and the third roller.

In some embodiments, a distance between the soil and the first roller is adjustable. In some embodiments, the first roller is positioned in the pivot frame and the distance between the soil and the first roller is adjustable by pivoting the pivot frame about the pivot axis. In some embodiments, the first roller is positioned in the pivot frame and the distance between the soil and the first roller is adjustable by moving the first roller between an end of the pivot frame and the pivot axis.

In some embodiments, the first and second rollers are a length that permits multiple rows of agricultural tubing to be pulled from the soil. In some embodiments, the tubing to be extracted is threadable under the first roller and over the second roller in an s-curve. In some embodiments, the first and second rollers are free spooling.

In some embodiments, disclosed is a method of extracting agricultural tubing from a soil of a field, the method comprising: providing an extractor comprising: a frame; a pivot frame disposed on the frame, the pivot frame and the frame creating a pivot axis around which the pivot frame is pivotal; and a first roller secured to the frame; and a second roller secured to the pivot frame so that the second roller is movable by pivoting the pivot frame about the pivot axis; positioning at least a portion of the pivot frame to form an angle as measured from a plane between the first and second rollers and a plane approximately parallel with a surface of the soil with the first roller positioned closer to the soil than the second roller; threading a tubing to be extracted under the first roller and over the second roller; moving the extractor over the soil from which the tubing is to be removed; and pulling the tubing from the soil with the tubing moving under the first roller and over the second roller as the extractor moves over the field.

In some embodiments, the step of positioning the pivot frame of the extractor comprises positioning the second roller above a top surface of the frame of the extractor with the first roller below a bottom surface of the frame of the extractor. In some embodiments, the frame comprises a wheel and a hitch and the step of moving the extractor comprises pulling the extractor with a vehicle. In some embodiments, the method comprises locking the pivot frame at different angles with the first roller positioned closer to the soil than the second roller depending upon at least one of a depth at which the tubing is buried in the soil, conditions of the soil, or a composition of the soil. In some embodiments, the method comprises determining the angle as measured from a plane between the first and second rollers and a plane approximately parallel with a surface of the soil based on at least one of a depth at which the tubing is buried in the soil, conditions of the soil, or a composition of the soil.

In some embodiments, the angle is approximately 45°. In some embodiments, the method comprises the angle is greater than approximately 45°.

In some embodiments, the first roller is positioned in the pivot frame and the method comprises adjusting at least one of the first roller or the second roller along the pivot frame relative to the pivot axis. In some embodiments, the method comprises adjusting the second roller along the pivot frame relative to the pivot axis to adjust a distance between the first roller and the second roller.

In some embodiments, the method comprises securing a third roller in the frame between the first and second rollers. In some embodiments, the step of threading comprises threading the tubing to be extracted under the first roller and over the third and second rollers in an s-curve with the tubing being approximately linear between the third roller and the second roller. In some embodiments, the method comprises adjusting the third roller between the first roller and the second roller to adjust at least one of a distance between the first roller and the third roller or a distance between the second roller and the third roller.

In some embodiments, the method comprises adjusting a distance between the surface of the soil and the first roller. In some embodiments, the first roller is positioned in the pivot frame and the step of adjusting comprises pivoting the pivot frame about the pivot axis to adjust the distance between the surface of the soil and the first roller. In some embodiments, the first roller is positioned in the pivot frame and the step of adjusting comprises moving the first roller between an end of the pivot frame and the pivot axis to adjust the distance between the surface of the soil and the first roller.

In some embodiments, the step of threading comprises threading multiple rows of agricultural tubing to be pulled from the soil around the first and second rollers. In some embodiments, the method comprises securing in a stationary position an exposed end of the tubing that has been threaded around the first and second rollers. In some embodiments, the first and second rollers are free spooling and further comprising distributing forces across circumferences of the first and second rollers as the first and second rollers pull the tubing from the soil as the extractor moves over the field. In some embodiments, the step of threading comprises threading a tubing to be extracted under the first roller and over the second roller in an s-curve.

In some embodiments, the frame comprises a first side and a second side and the pivot frame comprises a first upper arm attached to the first side of the frame and a second upper arm attached to the second side of the frame with the first upper arm and the second upper arm being pivotal about the pivot axis. In some embodiments, the second roller is positioned between the first and second arms and the pivot axis is formed by attaching the first and second upper arms of the pivot frame to the frame inside of the position of the first roller such that the pivot axis is in front of the first roller in a direction of travel during use of the extractor. In some embodiments, the second roller is positioned in a location outside of the first roller such that the second roller is behind the first roller with the second roller following the first roller in the direction of travel.

In some embodiments, the step of positioning at least a portion of the pivot frame at an angle further comprises rotating the first and second upper arms. In some embodiments, the pivot frame comprises a first lower arm attached to the first side of the frame and a second lower arm attached to the second side of the frame and the first roller is positioned between the first and second lower arms and the second roller is positioned between the first and second upper arms with the first and second lower arms being stationary. In some embodiments, the method comprises adjusting the first roller along the first and second lower arms of the pivot frame. In some embodiments, the method comprises controlling the pivoting of the pivot frame about the pivot axis with a controller.

In some embodiments, disclosed herein is an extractor for removing agricultural tubing from soil of a field, the extractor comprising: a frame comprising a first side and a second side; a pivot frame disposed on the frame, the pivot frame having a pivot axis and comprising a first upper arm and first lower arm attached to the first side of the frame and a second upper arm and second lower arm attached to the second side of the frame with at least the first upper arm and the second upper arm being pivotal about the pivot axis; a first roller secured to the pivot frame between the first and second lower arms and a second roller secured to the pivot frame positioned between the first and second upper arms; and the first upper arm and the second upper arm being positionable to from an acute angle of the pivot frame as measured from a plane between the first and second rollers and a plane approximately parallel with a surface of the soil with the first roller positioned closer to the soil than the second roller so that a tubing to be extracted is threadable under the first roller and over the second roller.

In some embodiments, the first and second lower arms are stationary. In some embodiments, the first roller is adjustable along the first and second lower arms of the pivot frame. In some embodiments, the first and second upper arms of the pivot frame are pivotable at the pivot axis to permit the angle to be variable.

In some embodiments, the extractor comprises a controller for pivoting the first and second upper arms of the pivot frame about the pivot axis to permit the angle of the pivot frame to be variable. In some embodiments, the first and second rollers are adjustable along the pivot frame relative to the pivot axis.

In some embodiments, the extractor comprises a third roller secured to the pivot frame between the first and second rollers. In some embodiments, the first, second and third rollers are positioned relative to one another on the pivot frame so that a tubing to be extracted is threadable under the first roller and over the third and second rollers in an s-curve with the tubing being approximately linear between the third roller and the second roller. In some embodiments, the third roller is adjustable along the pivot frame between the first roller and the second roller to adjust at least one of a distance between the first roller and the third roller or a distance between the second roller and the third roller.

It is, therefore, an object of the disclosure herein to provide novel agricultural tubing extractors and methods as described for example in further detail herein. These and other objects as can become apparent from the disclosure herein are achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 12A is a side plan view illustrating another embodiment of an extractor for removing agricultural tubing from soil of a field according to the subject matter disclosed herein;

DETAILED DESCRIPTION

Figure 1:
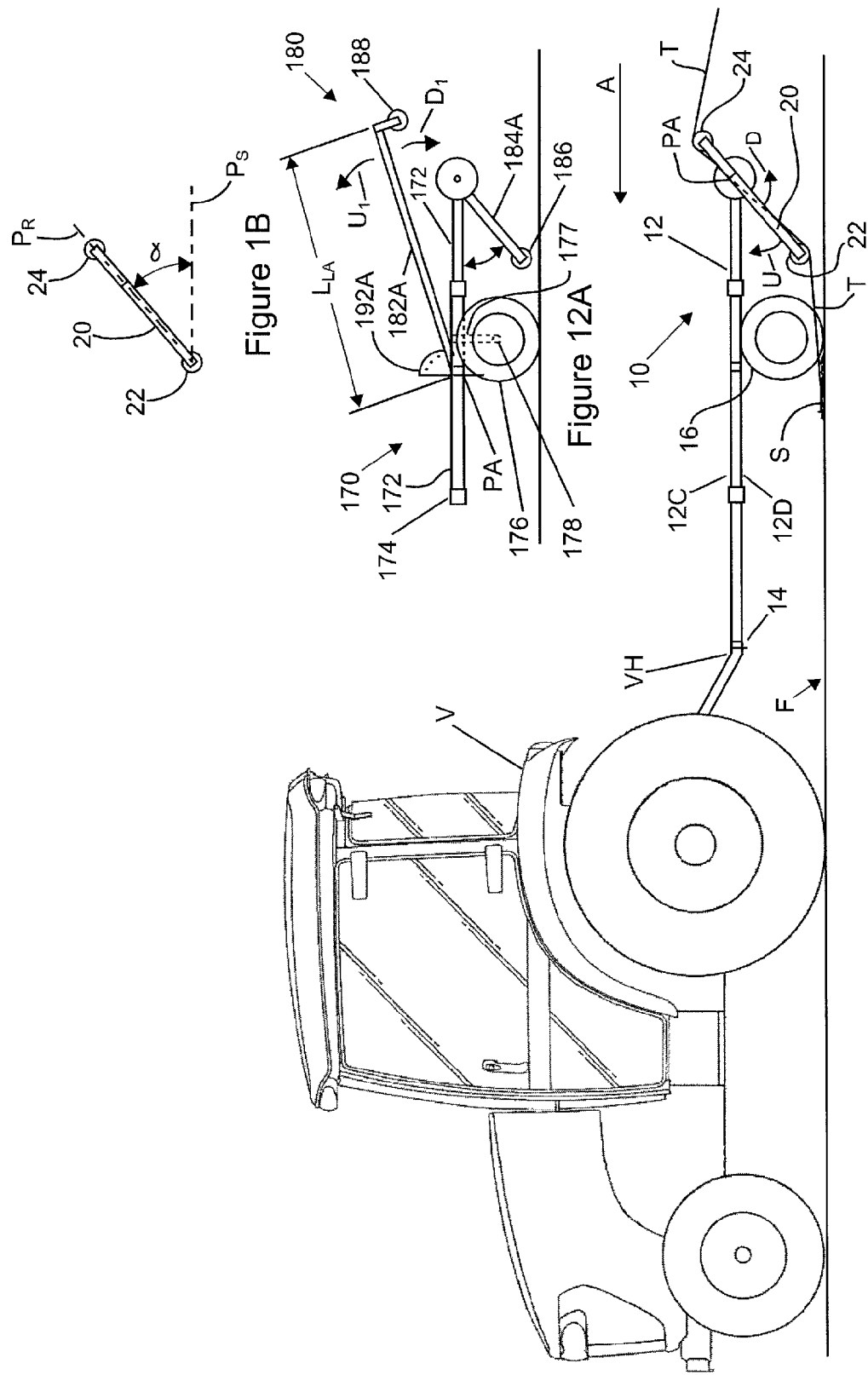
FIG. 1A is a side plan view illustrating an embodiment of an extractor for removing agricultural tubing from soil of a field according to the subject matter disclosed herein.
FIG. 1B is a schematic view illustrating a portion of an embodiment of a pivot frame used in the extractor according to FIG. 1.

Reference will now be made in detail to possible aspects or embodiments of the subject matter herein, one or more examples of which are shown in the figures. Each example is provided to explain the subject matter and not as a limitation. In fact, features illustrated or described as part of one embodiment can be used in another embodiment to yield still a further embodiment. It is intended that the subject matter disclosed and envisioned herein covers such modifications and variations.

As illustrated in the various figures, some sizes of structures or portions are exaggerated relative to other structures or portions for illustrative purposes and, thus, are provided to illustrate the general structures of the present subject matter. Furthermore, various aspects of the subject matter disclosed herein may be described with reference to a structure or a portion being on other structures, portions, or both. As will be appreciated by those of skill in the art, references to a structure being "on" or "above" another structure or portion contemplates that additional structure, portion, or both may intervene. References to a structure or a portion being "on" another structure or portion without an intervening structure or portion may be described herein as being "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on," "above," "upper," "top," "front," "behind," "lower," or "bottom" are used herein to describe one structure's or portion's relationship to another structure or portion as illustrated in the figures. It will be understood that relative terms such as "on," "above," "upper," "top," "front," "behind," "lower," or "bottom" are intended to encompass different orientations of the apparatus in addition to the orientation depicted in the figures. For example, if the apparatus in the figures is turned over, structure or portion described as "above" other structures or portions would now be oriented "below" the other structures or portions. Likewise, if apparatuses in the figures are rotated along an axis, structure or portion described as "above", other structures or portions would now be oriented "next to" or "left of" the other structures or portions. It is understood that these terms are intended to encompass different orientations of the apparatus in addition to the orientation depicted in the figures. Like numbers refer to like elements throughout.

The disclosure herein is directed to an extractor for removing agricultural tubing, such as irrigation tubing, or drip tape. The extractor can comprise a frame with a pivot frame disposed on the frame. The pivot frame and the frame can form a pivot axis around which at least a portion of the pivot frame can be pivotal. The extractor can also comprise a first roller secured to the frame. The first roller can be secured directly to the frame or can be secured in the pivot frame and a second roller can be secured to the pivot frame. The second roller can be movable by pivoting the pivot frame about the pivot axis to form an angle as measured from a plane between the first and second rollers and a plane approximately parallel with a surface of the soil with the first roller positioned closer to the soil than the second roller. Thereby, a tubing, such as a drip tape, to be extracted from a field can be threaded under the first roller and over the second roller. Depending on the length of the rollers and the spacing of the tubings in the field, multiple tubings, for example, 2, 3, 4, 5, 6, 7, or 8 tubings, can be pulled from the field with each pass of the extractor.

In particular, an end portion of each tubing can be pulled up from the field on one end of the field. The exposed end portion of each tubing can be wrapped under the first roller and over the second roller so that the tubing forms an s-curve around the first and second rollers. The exposed ends of the tubings can be held stationary. For example, the exposed ends can be held by a clamping device, tied to a stake embedded in the ground, or the like. As the extractor is pulled away from the exposed end portions of the tubings that are held stationary and toward the buried portions of the tubings, the tubings are removed from the soil. The first and second rollers can be free spooling to allow them to rotate as the tubings are pulled from the soil of the ground and around the first and second rollers. The free spooling helps to distribute forces across the circumferences of the first and second rollers as the first and second rollers pull the tubing from the soil of the ground as the extractor moves across the field.

Figure 2:
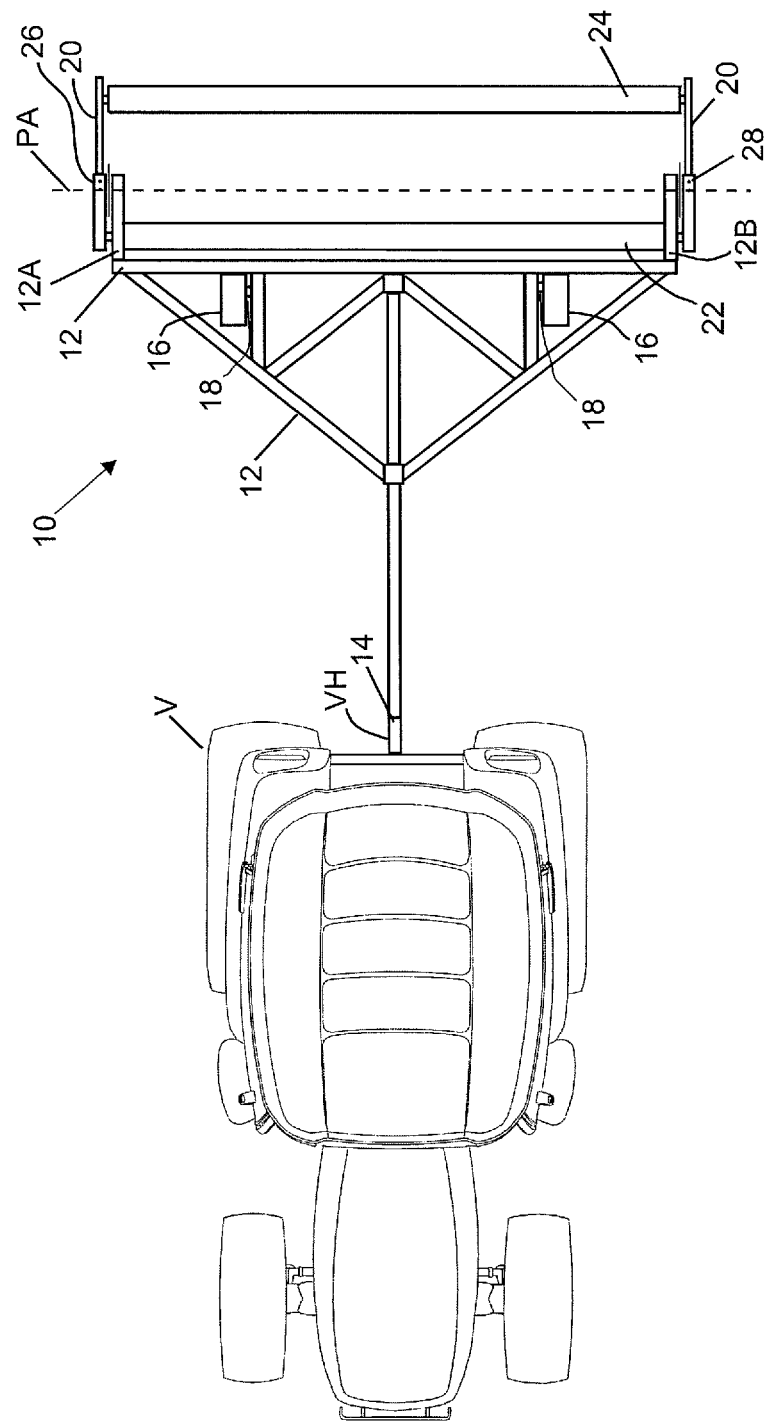
FIG. 2 is a top plan view illustrating the embodiment of the extractor for removing agricultural tubing from soil of a field according to FIG. 1.

FIGS. 1A and 2 illustrate an example embodiment of an extractor generally designated 10 for removing agricultural tubing T from soil S of a field F. FIG. 1A shows a tubing T engaging a portion of extractor 10, while FIG. 2 shows extractor 10 without tubing T engaging it. Extractor 10 can comprise a frame 12 that can be hitched to a vehicle V, such as a tractor or truck, to move extractor 10 along field F. For example, frame 12 can include a hitch 14 that can be attached to a corresponding vehicle hitch VH. For example, hitch 14 can be a hitch ball and corresponding hitch VH can be a ball receiver. In an alternative example, hitch 14 can be an apertured sleeve that can be placed upon or within a corresponding apertured sleeve of the corresponding vehicle hitch VH with an attachment rod secured through the apertures in the respective sleeves. Frame 12 can also include one or more wheels 16 to permit easy transport of extractor 10. Frame 12 can thus be movably supported by allowing wheels 16 to roll over soil S as vehicle V pulls extractor 10 over field F. Two wheels 16 are shown in FIG. 2 which turn on individual axles 18 secured to frame 12. It should be understood that more than two wheels 16 can be used on frame 12. Further, it should be understood that wheels 16 can rotate about a single axle.

Continuing with reference to FIGS. 1A and 2, extractor 10 can include a pivot frame 20 disposed on frame 12. Pivot frame 20 can include a pivot axis PA around which at least a portion of pivot frame 20 can be pivoted. A first roller 22 can be secured to frame 12 by securing first roller 22 to pivot frame 20 on a first side of pivot axis PA. A second roller 24 can be secured to pivot frame 20 on a second opposite side of the pivot axis PA. At least a portion of pivot frame 20 can be positioned at an angle such that first roller 22 is positioned closer to soil S than second roller 24. For example, second roller 24 and first roller 22 can be movable by pivoting pivot frame 20 about pivot axis PA to form an angle α as measured from a plane $P_R$ (see FIG. 1B) between first and second rollers 22, 24 and a plane $P_S$ (see FIG. 1B) approximately parallel with a surface of soil S with first roller 22 positioned closer to soil S than second roller 24. Once pivot frame 20 is in position, it can be secured or locked in that position. As shown in FIG. 1A, tubing T to be extracted from soil S in field F can be threaded under first roller 22 and over second roller 24 in generally an s-shaped curve. First and second rollers 22, 24 can be free spooling, i.e., freely rotatable, to permit first and second rollers 22, 24 to freely rotate about their individual axes as discussed below. The free spooling helps to distribute forces across the circumferences of first and second rollers 22, 24 as first and second rollers 22, 24 pull tubing T from soil S as extractor 10 moves across field F. In such a manner, a tension in tubing T can be created as extractor 10 rolls over field F toward the buried portion of tubing T that is strong enough to pull tubing T from soil S, but not so strong as to cause tubing T to break.

Referring now to FIGS. 1A, 1B and 2, to help facilitate the creation of an acceptable tension, pivot frame 20 can be positioned on frame 12 so that first roller 22 can be placed in a position in front of and below second roller 24 as seen from an expected direction of travel A of extractor 10. Thus, first roller 22 is at a distance that is closer to soil S from which tubing T is being extracted with second roller 24 above and further back than first roller 22, again relative to direction of travel A. Thus, as shown in FIG. 1B, an angle α can be measured from a plane $P_R$ between first roller 22 and second roller 24 and a plane $P_S$ approximately parallel with a surface of soil. As shown, angle α can be considered an acute angle. Since at least a portion of pivot frame 20 is pivotal around pivot axis PA, angle α can be changed. For example, angle α can be determined based on at least one of a depth at which tubing T is buried in soil S, conditions of soil S, or a composition of soil S. For example, angle α can be larger for softer soil.

Different embodiments of extractors can have different pivot frames to permit the changing of angle α. For example, in some embodiments, like the one shown in FIGS. 1A, 1B, and 2, frame 12 can comprise a first side that includes a side frame 12A and a second side that includes a side frame 12B. Further, pivot frame 20 can comprise a first arm 26 attached to the first side frame 12A and a second side arm 28 attached to the second side frame 12B creating pivot axis PA among the first and second arms 26, 28 and frame 12. In such embodiments, first roller 22 can be positioned between first arm 26 and second arm 28 on a first side of pivot axis PA and second roller 24 can be positioned between first arm 26 and second arm 28 on a second opposite side of pivot axis PA. Thus, pivot frame 20 is pivotal at pivot axis PA to permit the angle of pivot frame 20 and formed by the position of rollers 22, 24 to be variable. As pivot frame 20 is pivoted around pivot axis PA, first arm 26 and second arm 28 rotate in tandem such that as first arm 26 and second arm 28 are rotated in a direction U (see FIG. 1A), angle α becomes smaller or more acute. At the same time, the distance between first roller 22 and a surface of soil S from which tubing T is being extracted can be increased when first arm 26 and second arm 28 are rotated in a direction U. Alternatively, as first arm 26 and second arm 28 are rotated in a direction D (see FIG. 1A), angle α becomes larger. At the same time, the distance between first roller 22 and a surface of soil S from which tubing T is being extracted can be decreased when first arm 26 and second arm 28 are rotated in a direction D. As with angle α, the distance between first roller 22 and a surface of soil S from which tubing T is being extracted can be determined based on at least one of a depth at which tubing T is buried in soil S, conditions of soil S, or a composition of soil S. For example, the evenness, or unevenness, of the surface of soil S can affect the selection of such a distance.

Generally, in such embodiments, first roller 22 is kept below frame 12 and second roller 24 is kept above frame 12. For example, frame 12 can comprise a top surface 12C and a bottom surface 12D with first roller 22 being positioned below bottom surface 12D of frame 12 and second roller 24 being positioned above top surface 12C of frame 12.

Angle α can be set before the extraction of tubing T begins. For example, pivot frame 20 can be pivoted about pivot axis PA until pivot frame 20 is at a desired angle α and then it can be secured, or locked, into position. For instance, a locking element can be used to lock pivot frame in different angles as desired with first roller 22 positioned closer to the soil than second roller 24. Such locking elements can include hydraulic mechanisms, such as hydraulic cylinders, electro-mechanical mechanisms, such as electric motors and manual mechanical mechanisms, such as dial and spring rod or a ratchet and pall, for example.

Referring again to FIG. 1B, angle α as measured from plane $P_R$ between first and second rollers 22, 24 and plane $P_S$ approximately parallel with a surface of soil S (FIG. 1A) can range, for example, between approximately 20° and approximately 80°. In some embodiments, angle α as measured from plane $P_R$ between first and second rollers 22, 24 and plane $P_S$ approximately parallel with a surface of soil S can range, for example, between approximately 40° and approximately 70°. Angle α as measured from plane $P_R$ between first and second rollers 22, 24 and plane $P_S$ approximately parallel with a surface of soil S can be set at greater than approximately 45°. Angle α as measured from plane $P_R$ between first and second rollers 22, 24 and plane $P_S$ approximately parallel with a surface of soil S can also be set at approximately 45°.

Figure 3:
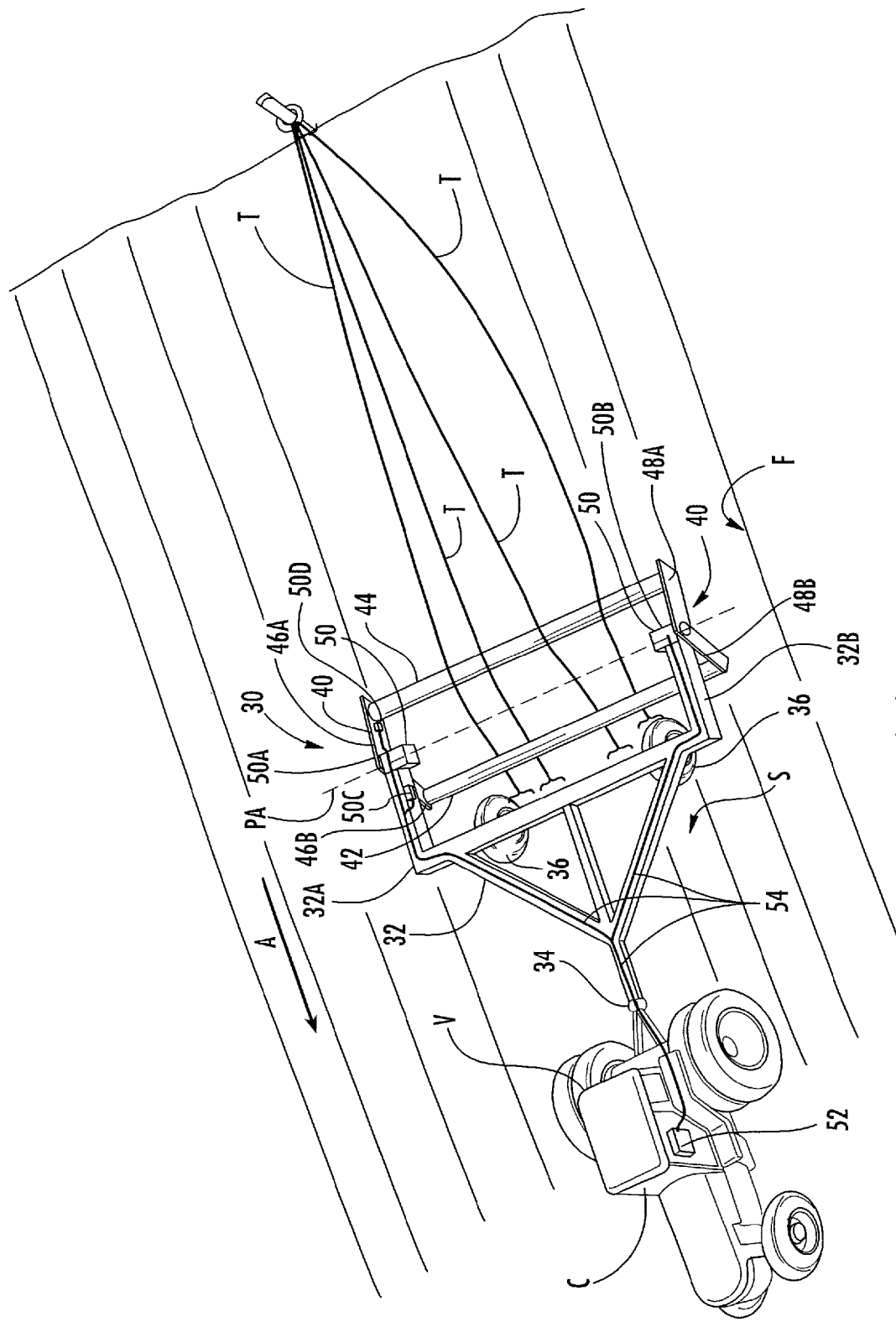
FIG. 3 is a top perspective view illustrating another embodiment of an extractor for removing agricultural tubing from soil of a field according to the subject matter disclosed herein.

FIG. 3 illustrates an example of an embodiment that uses a different pivot frame to permit the changing of angle α. In FIG. 3, an extractor generally designated 30 is provided for removing agricultural tubing T from soil S of a field F. Extractor 30 can comprise a frame 32 and a pivot frame 40 disposed on frame 32. Frame 32 can comprise wheels 36 and a hitch 34 to permit frame 32 to be pulled by a vehicle V. Pivot frame 40 can include a pivot axis PA around which at least a portion of pivot frame 40 can be pivoted. A first roller 42 can be secured to frame 32 directly or can secured to frame 32 by securing first roller 42 to pivot frame 40 on a first side of pivot axis PA. A second roller 44 can be secured to pivot frame 40 so that it can be positioned on a second opposite side of pivot axis PA. At least a portion of pivot frame 40 can be positioned such that first roller 42 is positioned closer to soil S than second roller 44. In such a manner, at least second roller 44 can be movable by pivoting pivot frame 40 about pivot axis PA to form an angle as measured from a plane (not shown in FIG. 3) between first and second rollers 42, 44 and a plane (not shown in FIG. 3) approximately parallel with a surface of soil S with first roller 42 positioned closer to soil S than second roller 44. As shown in FIG. 3, multiple tubings T to be extracted from soil S in field F can be threaded under first roller 42 and over second roller 44. Similar to the embodiment shown in FIGS. 1A and 2, first and second rollers 42, 44 in FIG. 3 can be free spooling to permit first and second rollers 42, 44 to freely rotate about their individual axes. Tubings T can be tied to a stake ST, or clamped by a clamping device (not shown), to hold the loose end portions of tubings T stationary as extractor 30 is moved in a forward direction A. In such a manner, a tension in tubing can be created as extractor 30 rolls over field F toward the buried portion of tubings T that is strong enough to pull tubings T from soil S, but not so strong as to cause tubings T to break.

Continuing with reference to FIG. 3, frame 32 can comprise a first side that includes a side frame 32A and a second side that includes a side frame 32B. Further, pivot frame 40 can comprise a first upper arm 46A and a first lower arm 46B attached to first side frame 32A. Pivot frame 40 can comprise a second upper arm 48A and a second lower arm 48B attached to second side frame 32B. Alternatively, in some embodiments, first and second lower arms 46B and 48B can be an integral portion of frame 32. First roller 42 can be positioned between first and second lower arms 46B, 48B and second roller 44 can be positioned between first and second upper arms 46A, 48A. Instead of both upper and lower arms rotating together, in some embodiments as the one shown in FIG. 3, first upper arm 46A and second upper arm 48A can pivot about pivot axis PA. In some of these embodiments, first and second lower arms 46B, 48B can be stationary. Thus, the angle as measured from a plane (not shown) between first and second rollers 42, 44 and a plane (not shown) approximately parallel with a surface of soil S can be changed by rotating first and second upper arms 46A, 48A about pivot axis PA and thereby changing the position of the second roller 44.

In some embodiments, first roller 42 can be adjustable along first and second lower arms 46B, 48B of pivot frame 40. In such a manner, first roller 42 can be move to vertically raise and lower first roller 42 relative to the ground or soil S. In some embodiments, the distance between first roller 42 and the surface of soil S can be controlled by movement of frame 32 of extractor 30 in which pivot frame 40 is secured. For example, entire frame 32 can be configured to be lifted or lowered by having the transport wheels adjustable hydraulically.

A controller 50 can be provided for pivoting first and second upper arms 46A, 48A of pivot frame 40 about pivot axis PA. Controller 50 can be used to rotate first and second upper arms 46A, 48A and to rotate rollers 42, 44. Controller 50 can comprise a rotator 50A on first side frame 32A that engages first upper arm 46A; a rotator 50B on second side frame 32B that engages second upper arm 48A; a rotator 50C on first side frame 32A that engages roller 42; and a rotator 50D on first side frame 32A that engages that engages roller 44. Rotators 50A, 50B, 50C, and 50D can include hydraulic mechanisms, such as hydraulic cylinders or electro-mechanical mechanisms, such as electric motors, for example. Controller 50 can also include a controller interface 52 with which the user interfaces to cause the rotators 50A, 50B, 50C, and 50D to move first and second upper arms 46A, 48A and rollers 42, 44. Controller interface 52 can be located on extractor 30. Alternatively, as shown in FIG. 3, controller interface 52 of controller 50 can be located in a cab C of vehicle V to allow the user to operate rotators 50A, 50B, 50C, and 50D from inside cab C. For example, controller interface 52 can be connected to controller 50 by wires 54 to allow controller interface 52 to communicate with controller 50. In some embodiments, controller interface 52 can be in wireless communication with controller 50. As above, the position of pivot frame 40 and the angle that first and second rollers 42, 44 form can be determined based on at least one of a depth at which tubing T is buried in soil S, conditions of soil S, or a composition of soil S.

Figure 4:
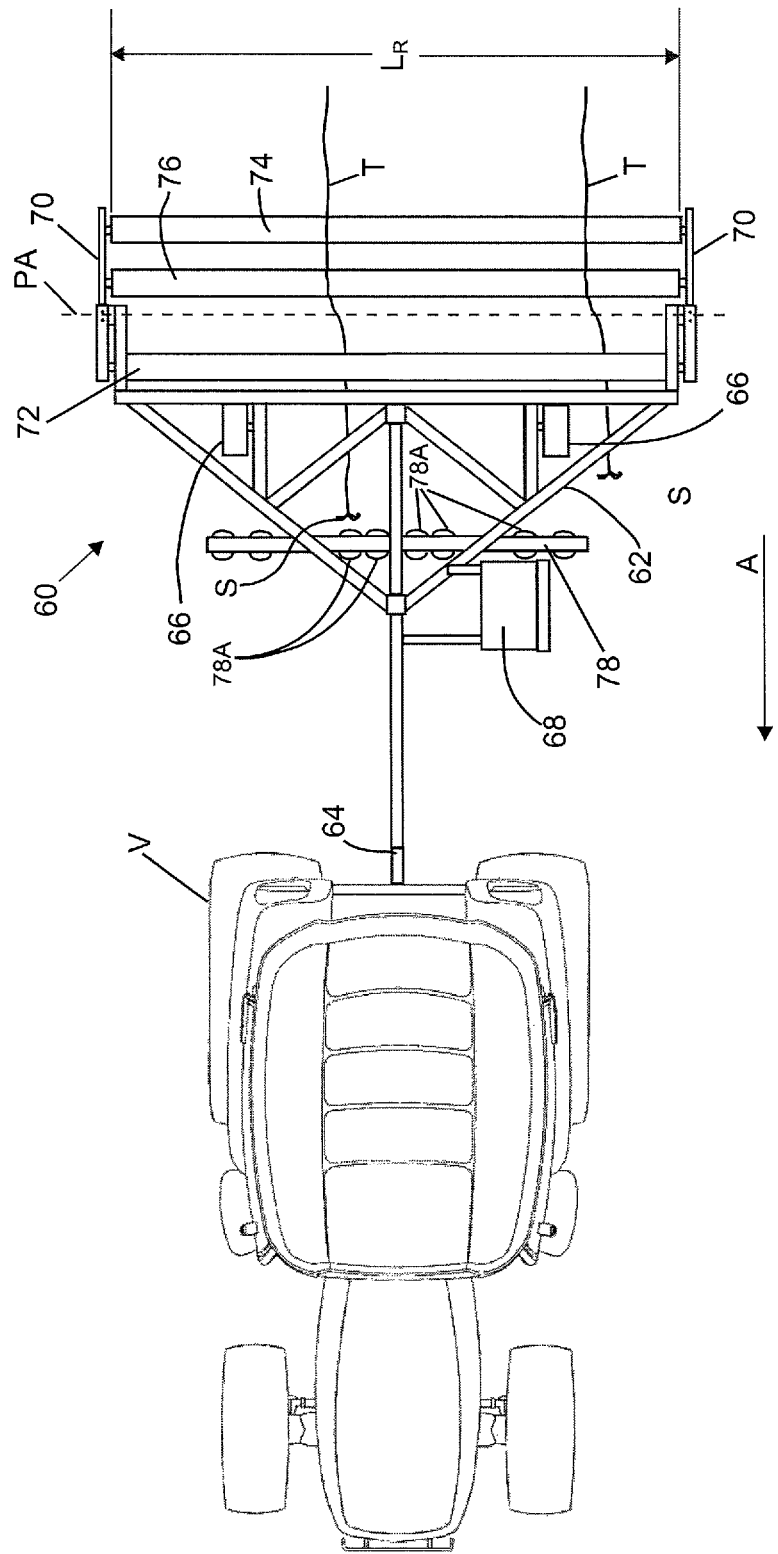
FIG. 4 is a top plan view illustrating a further embodiment of an extractor for removing agricultural tubing from soil of a field according to the subject matter disclosed herein.

FIG. 4 illustrates another example embodiment of an extractor generally designated 60 for removing agricultural tubing T from soil S of a field. Extractor 60 can comprise a frame 62 and a pivot frame 70 disposed on frame 62. Frame 62 can comprise wheels 66 and a hitch 64 to permit frame 62 to be pulled by a vehicle V. Further, frame 62 can comprise a platform 68 on which a worker can stand or sit to monitor the tubing extractions in progress and to notify the driver if a breakage of a tubing T occurs.

Pivot frame 70 can include a pivot axis PA around which at least a portion of pivot frame 70 can be pivoted. A first roller 72 can be to frame 62 by securing first roller 72 to pivot frame 70. A second roller 74 can be secured to pivot frame 70 so that second roller 74 can be movable by pivoting pivot frame 70 about pivot axis PA. In particular, in the embodiment shown, first roller 72 can be secured to pivot frame 70 on a first side of pivot axis PA and second roller 74 secured to pivot frame 70 on a second opposite side of pivot axis PA. Thus, at least a portion of pivot frame 70 can be positioned such that first roller 72 is positioned closer to soil S than second roller 74. A third roller 76 can be secured to pivot frame 70 between first and second rollers 72, 74. For example, first roller 72, second roller 74 and third roller 76 can be positioned relative to one another on pivot frame 70 so that tubings T to be extracted from soil S can be threaded under first roller 72 and over third roller 76 and second roller 74 in an s-curve with the tubing being approximately linear between third roller 76 and second roller 74. In this manner, forces on second roller 74 created by the tension in tubings T that can cause second roller 74 to buckle, especially in a middle portion of second roller 74, can be reduced. This is especially true when the roller 74 has a length $L_R$ that is long. First and second rollers 72, 74 can be a length $L_R$ that permits multiple rows of agricultural tubing T to be pulled from soil S. Having a third roller 76 can help alleviate some of these forces on second roller 74, should thus be desired.

Length $L_R$ of rollers 72, 74, 76 can be any length that permits efficient and effect removal of tubings T from the soil. For example, length $L_R$ can be more than about 8 feet in some embodiments. In some embodiments, length $L_R$ can be more than about 10 feet or about 12 feet. In some embodiments, length $L_R$ can be about 16 feet or greater. The diameter of rollers 72, 74, 76 can vary. For example, the diameter can be about 4 inches or greater. In some embodiments, the diameter can be about 6 inches or greater. In some embodiments, the diameter can be about 8 inches or greater. In some embodiments, the diameter can be between about 4 inches and about 10 inches. In some embodiments, the diameter can be between about 6 inches and about 8 inches. Rollers 72, 74, 76 can comprise any suitable material. For example, can be a plastic or a metal. In some embodiments, rollers 72, 74, 76 can be a polyvinyl chloride (PVC) roller or pipe that are attached to pivot frame 70 in a manner to allow rotation of rollers 72, 74, 76. In some embodiments, rollers 72, 74, 76 can be aluminum rollers or pipes that are attached to pivot frame 70 in a manner to allow rotation of rollers 72, 74, 76.

Further, in some embodiments as the one shown in FIG. 4, a rack 78 of rotary discs 78A can be attached to frame 62 of extractor 60. Depending on the depth at which tubings T are buried, rotary discs 78A can be used to break up soil S above tubings T to make extraction of tubings T easier. However, care should be taken to prevent cutting of tubings T by rotary discs 78A, if the discs are used. Rack 78 of rotary discs 78A can extend about perpendicular to the direction of travel A of extractor 60 in front of rollers 72, 74 with rotary discs 78A contacting and breaking up soil S in the area from which tubings T are to be extracted.

In some embodiments (not shown), the frame of the extractor can be folded into an upright position to make transport easier. In such embodiments, first roller can comprise two rollers and second roller can comprise two rollers to make folding easier. In such embodiments, the pinching, or buckling, that may occur in some embodiments of the second roller can be reduced since the second roller comprises two rollers of a shorter length.

Figure 5A:
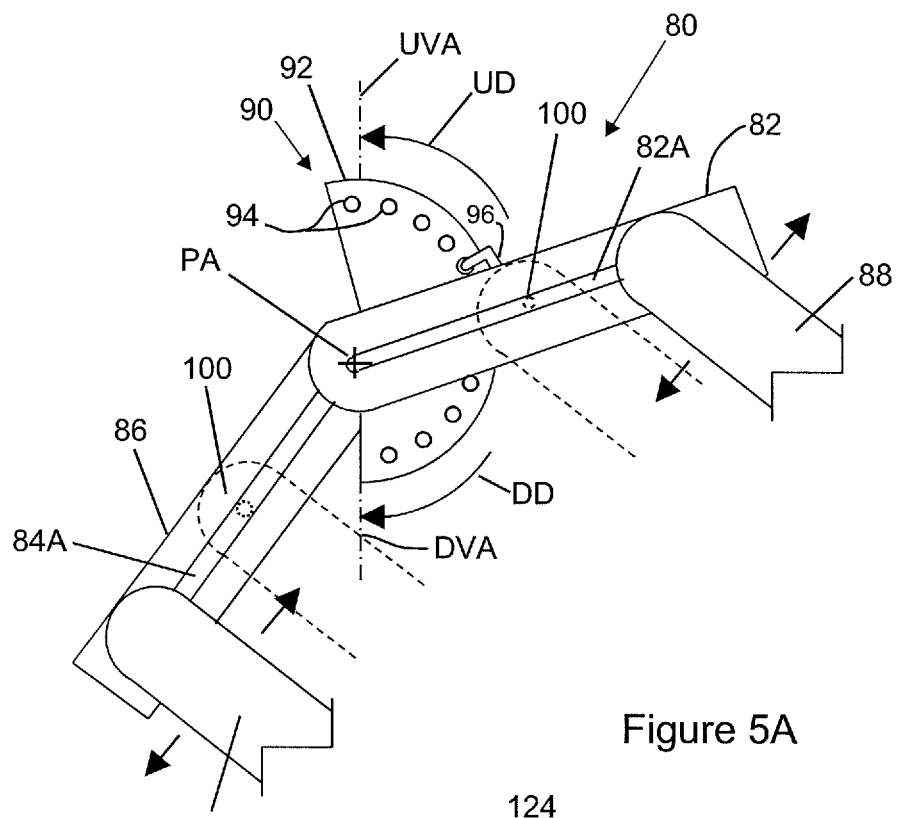
FIGS. 5A and 5B are perspective views illustrating portions of embodiments of pivot frames that can be used in embodiments of extractors for removing agricultural tubing from soil of a field according to the subject matter disclosed herein.
Figure 5B:
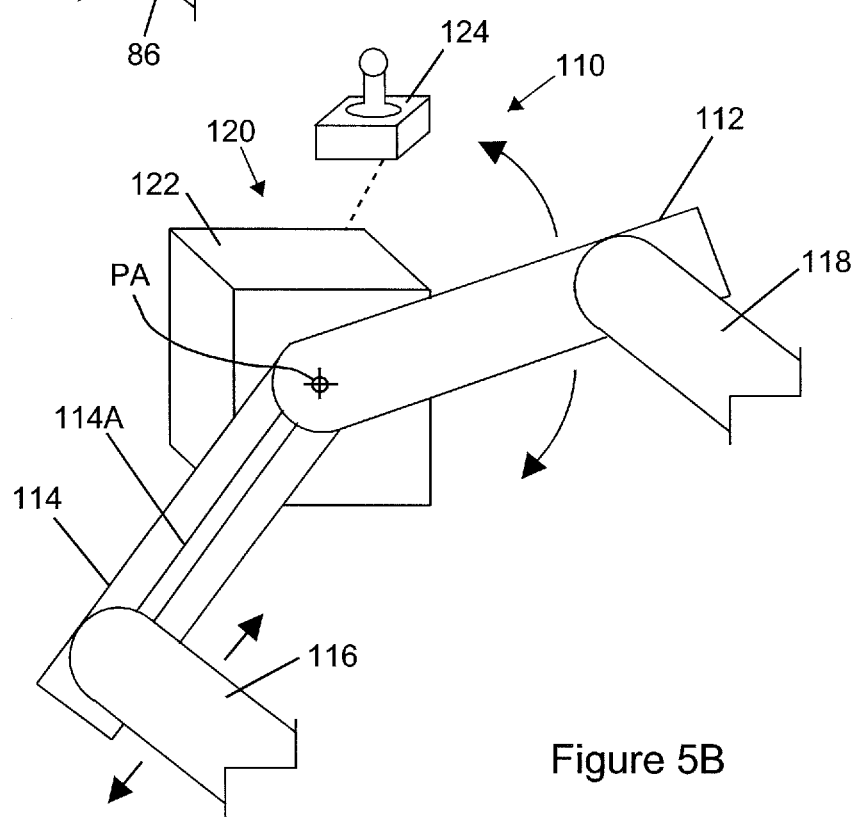

FIGS. 5A and 5B show different embodiments of portions of the pivot frames. In FIG. 5A, a portion of a pivot frame generally designated 80 of an extractor according to the disclosure herein is shown in which pivot frame 80 can comprise a set of upper arms 82 and a set of lower arms 84 of which only one side with one upper arm 82 and one lower arm 84 is illustrated. As above, a first roller 86 can be positioned between lower arms 84 and a second roller 88 can be positioned between upper arms 82. Also as above, upper arms 82 can pivot about a pivot axis PA. In some embodiments as shown in FIG. 5A, upper arms 82 can rotate approximately 180° from an upward vertical axis UVA to a downward vertical axis DVA, while lower arms 84 can be generally stationary. For example, as shown in FIG. 5A, upper arm 82 residing at a first angled position can be rotated therefrom in either an upward direction UD or a downward direction DD to position upper arm 82 in a different angled position.

A locking element generally designated 90 can be used to hold upper arm 82 in place. For example, as shown in FIG. 5A, locking element 90 can comprise a dial 92 with apertures 94 therein and a spring rod 96 attached to upper arms 82 for engaging apertures 94 in dial 92 to secure arms 82 in place. It is understood that while one upper arm is shown, such movement and locking element applies to the other upper arm of pivot frame 80 not illustrated and that the upper arms can be moved in tandem. Thus, pivot frame 80 can be used to move at least second roller 88 to create an angle as measured from a plane (not shown) between first and second rollers 86, 88 and a plane (not shown) approximately parallel with a surface of the soil from which the tubing is to be extracted. This angle can be changed by rotating upper arms 82 about pivot axis PA and thereby changing the position of the second roller 88.

Upper arms 82 can comprise a slot 82A therein and lower arms 84 can comprise a slot 84A therein to allow adjustment of the respective rollers 88, 86, along pivot frame relative to pivot axis PA. Further, a third roller 100 (shown in dotted lines) can optionally be included between upper arms 82 and lower arms 84 and can engage the respective slots 82A, 84A to lock third roller 100 in place and to permit movement of third roller 100 to adjust at least one of a distance between first roller 86 and third roller 100 or a distance between the second roller 88 and third roller 100.

In FIG. 5B, a portion of a pivot frame generally designated 110 of an extractor according to the disclosure herein is shown in which pivot frame 110 can comprise a set of upper arms 112 and a set of lower arms 114 of which only one side with one upper arm 112 and one lower arm 114 is illustrated. As above, a first roller 116 can be positioned between lower arms 114 and a second roller 118 can be positioned between upper arms 112. Also as above, upper arms 112 can pivot about a pivot axis PA.

In some embodiments as shown in FIG. 5B, upper arms 112 can be pivoted via a controller 120 that can be used to control rotation and to secure upper arms 112 and second roller 118 in a position to form a desired angle of pivot frame 110. For example, controller 120 can include one or more rotators 122 that can move, or rotate, upper arms 112 about pivot axis PA. Rotator 122 can comprise hydraulic mechanisms, such as hydraulic cylinders or electro-mechanical mechanisms, such as electric motors, for example. Thus, controller 120, and particularly rotators 122, can serve as locking elements once upper arms 112 are rotated to a desired position. Additionally, controller 120 can also comprise a controller interface 124 that can be used by the user to command the operation of rotators 122. In some embodiments, controller 120 can comprise a computing device that can include hardware and/or software processors at either rotators 122 or controller interface 124 or both.

Controller interface 124 can be on the extractor, for example, on or near a rotator 122. Alternatively, in some embodiments, controller interface 124 can be remote from the extractor, for example, in or on a vehicle that pulls the extractor. Further, controller interface 124 can communicate with rotators 122 through wired or wireless communication. Controller interface 124 can comprise different types of interfaces. For example, in some embodiments, controller interface 124 can be a handle that can be moved in at least two different directions to direct the upward rotation and downward rotation of upper arms 112. In some embodiments, for example, controller interface 124 can comprise a joystick that can remotely and wirelessly communicate with rotators 122. In some embodiments, for example, controller interface 124 can comprise a display device such as a tablet device, an interactive computer monitor, or a phone device. In some embodiments, controller 120 can comprise a computing device that can include hardware and/or software processors at either rotators 122 or controller interface 124 or both.

Thus, continuing with FIG. 5B, upper arms 112 can be rotated up to, for example, approximately 180°. In some embodiments, lower arms 114 can be stationary. In some embodiments, lower arms 114 can also be rotated by controller 120. The rotation of lower arms 114 can be used to move the first roller 116 to vertically raise and lower first roller 116 relative to the ground or soil S. Thus, the angle as measured from a plane (not shown) between first and second rollers 116, 118 and a plane (not shown) approximately parallel with a surface of the soil from which the tubing is to be extracted can be changed by rotating upper arms 112 about pivot axis PA and thereby changing the position of second roller 118. As shown in FIG. 5B, lower arms 114 can comprise a slot 114A therein to allow adjustment of the respective first roller 116 along pivot frame 110 relative to pivot axis PA. In some embodiments, the distance between first roller 116 and the surface of soil S can be controlled by movement of the frame of the extractor (not fully shown in FIGS. 5A and 5B) in which pivot frame 110 is secured. For example, the entire frame can be configured to be lifted or lowered by having the transport wheels adjustable hydraulically (not shown in the Figures).

Figure 6A:
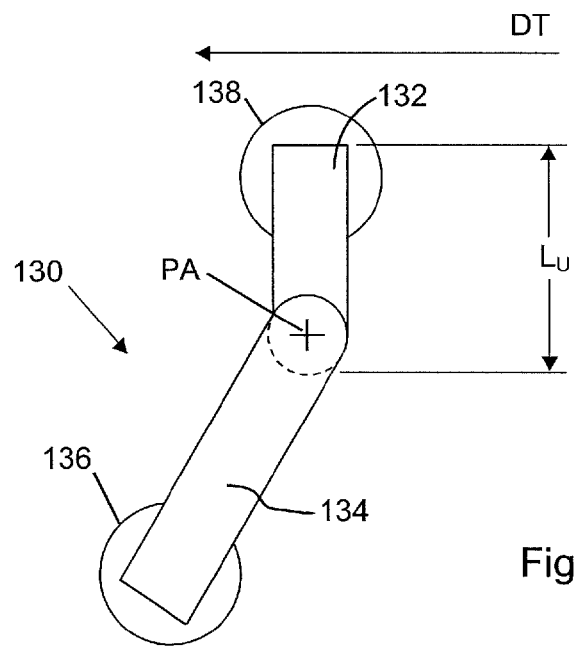
FIGS. 6A-6C are schematic views illustrating a portion of an embodiment of a pivot frame that can be used in an embodiment of an extractor for removing agricultural tubing from soil of a field according to the subject matter disclosed herein.
Figure 6B:
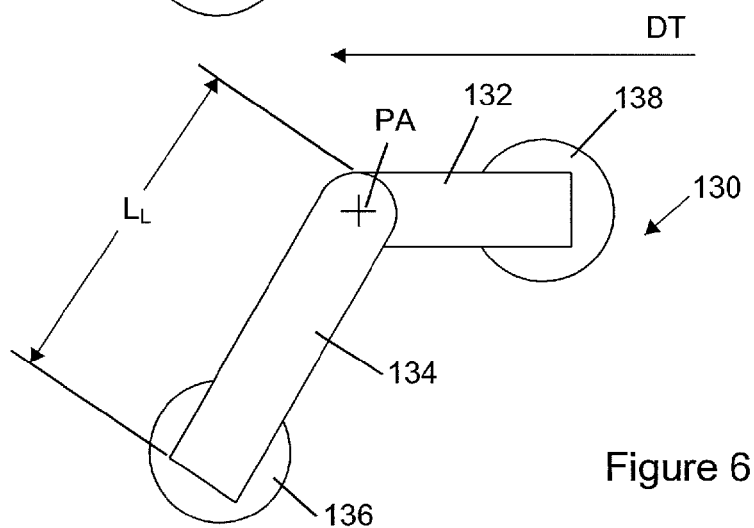
Figure 6C:
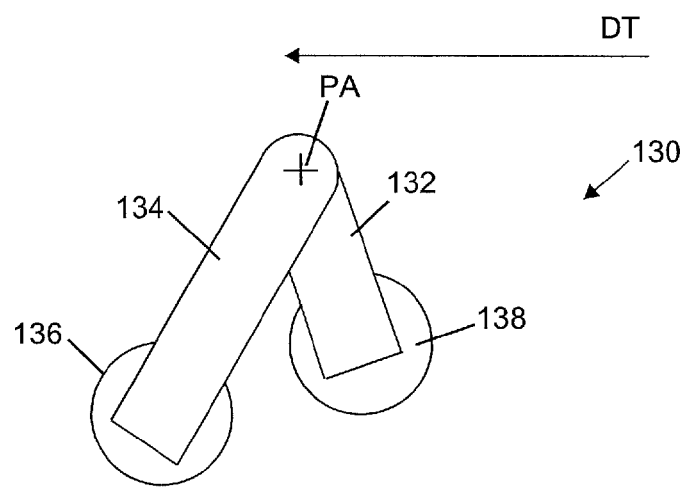

Referring to FIGS. 6A-6C, schematic drawings are provided of a portion of a pivot frame 130 of an embodiment of an extractor according to the disclosure herein. Pivot frame 130 can be secured or attached to a frame of an extractor and can comprise upper arms 132 and lower arms 134 of which only one upper arm 132 and one lower arm 134 are shown. A first roller 136 can be secured between lower arms 134 and a second roller 138 can be secured between upper arms 132.

Upper arms 132 can have a length $L_U$ that is shorter than a length $L_L$ of lower arm 134. Upper arms 132 can rotate about a pivot axis PA, while lower arms 134 can remain stationary. As shown in FIGS. 6A-6C, by having the lower arms 134 angled downward in a stationary position so that first roller 136 is below and in front of pivot axis PA as viewed if moving from right to left which corresponds to the direction of travel DT of the extractor on which pivot frame 130 resides, upper arms 132 can be rotated along an arc of about 180° while still keeping second roller 138 above and behind as viewed in the direction travel DT due to the shorter length $L_U$ of upper arms 132. This wide range of rotation of upper arms 132 as shown in FIG. 6A-6C can provide a number of different angles as measured from a plane (not shown) between first and second rollers 136, 138 and a plane (not shown) approximately parallel with a surface of the soil from which the tubing is being extracted. Further, such a wide range of rotation of upper arms 132 can also provide a wide range of distances between first roller 136 and second roller 138.

Figure 12B:
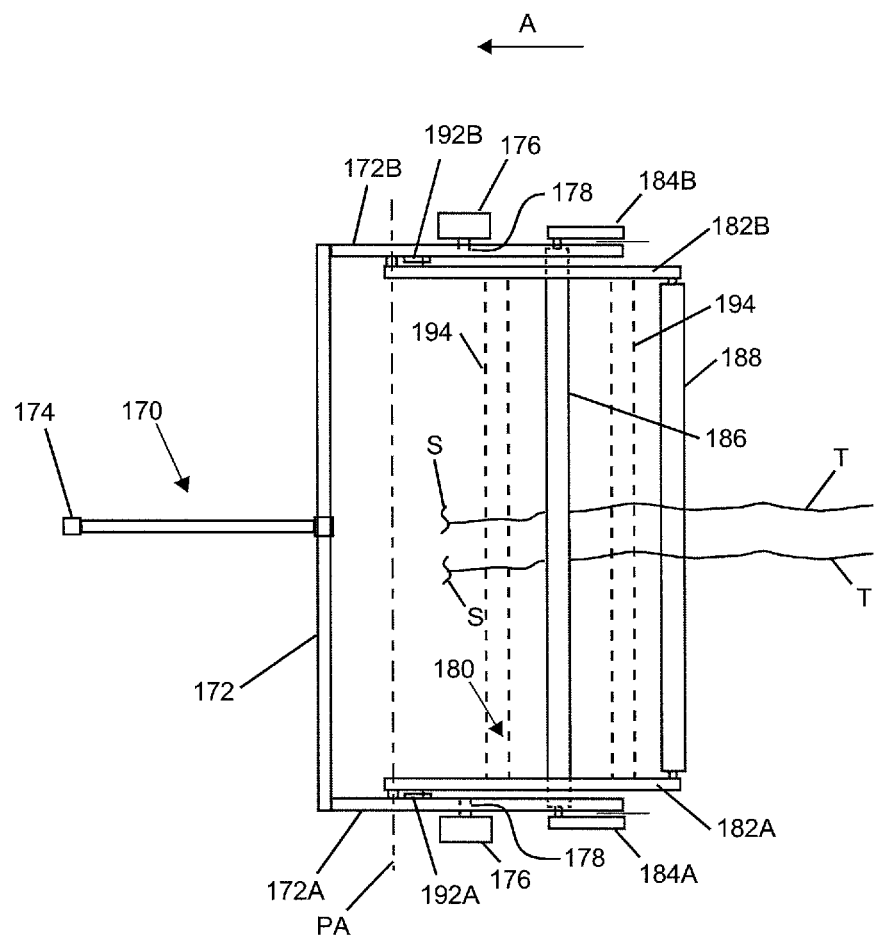
FIG. 12B is a top plan view illustrating the embodiment of the extractor for removing agricultural tubing from soil of a field according to FIG. 12A.

FIGS. 12A and 12B illustrate another embodiment of an extractor generally designated 170 for removing agricultural tubing from soil of a field. This extractor 170 can comprise a frame 172 and a pivot frame 180 that comprises long upper arms 182A and 182B (see FIG. 12B) to move a second roller 188 relative to a first roller 186. In such an embodiment, pivot frame 180 is attached to frame 172 of extractor 170 at a pivot axis PA that is inside of the position of first roller 186 such that pivot axis PA is in front of first roller 186 in a normal direction of travel A (see FIG. 12B) during use of the extractor, while second roller 188 can be held by long upper arms 182A and 182B in a location outside of first roller 186 such that second roller 188 follows first roller 186 as seen from the direction of travel A during use. For example, pivot axis PA of long upper arms 182A and 182B of pivot frame 180 can be located on frame 172 inside of a position where lower arms 184A and 184B are secured, attached or connected to frame 172 such that pivot axis PA is in front of the attachment point of lower arms 184A and 184B as seen from the direction of travel A during use, while second roller 188 can be held by long upper arms 182A and 182B in a location outside of first roller 186 such that second roller 188 follows first roller 186 as seen from the direction of travel A.

As with other embodiments, extractor 170 can comprise a frame 172 that can be hitched or attached to a vehicle (not shown in FIG. 12A or 12B), such as a tractor or truck, to move extractor 170 along a field. For example, frame 172 can include a hitch 174 that can be attached to a corresponding vehicle hitch (not shown in FIG. 12A or 12B). Frame 172 can also include one or more wheels 176 to permit easy transport of extractor 170. Frame 172 can thus be movably supported by allowing wheels 176 to roll over soil S as a vehicle pulls extractor 170 over a field. As above, two wheels 176 can turn on individual axles 178 secured to a structure 177 (shown in dotted lines in FIG. 12A) of frame 172. Further, it should be understood that wheels 176 can rotate about a single axle.

As stated above, extractor 170 can include pivot frame 180 disposed on frame 172. Pivot frame 180 can comprise pivot axis PA around which at least a portion of pivot frame 180, such as first and second upper arms 182A and 182B, can be pivoted. A first roller 186 can be secured to frame 170 and a second roller 188 can be secured to pivot frame 180. Second roller 188 can be movable by pivoting pivot frame 180 to form an angle such that the second roller 188 can be behind and above first roller 186 as viewed from left to right in FIG. 12A so that first roller 186 is positioned closer to soil S than second roller 188. Once pivot frame 180 is in position, it can be secured or locked in that position. For instance, locking elements 192A and 192B can be used to lock pivot frame so that different angles can be formed as desired with first roller 186 positioned closer to the soil than second roller 188. In the embodiment shown, locking elements 192A and 192B are similar to those shown in FIG. 5A. However, such locking elements can include hydraulic mechanisms, such as hydraulic cylinders, electro-mechanical mechanisms, such as electric motors and manual mechanical mechanisms, such as dial and spring rod or a ratchet and pall, for example. While shown close to pivot axis PA, locking elements 192A and 192B can be positioned further down pivot frame 180 closer to second roller 188 to reduce the moment forces created by the length and weight of upper arms 182A and 182B.

The tubing to be extracted from the soil in a field can be threaded under first roller 186 and over second roller 188 in generally an s-shaped curve. First and second rollers 186, 188 can be free spooling, i.e., freely rotatable, to permit first and second rollers 186, 188 to freely rotate about their individual axes as discussed below. In such a manner, a tension in the tubing can be created as extractor 170 rolls over the field toward the buried portion of tubing T. The tension can be strong enough to pull tubing T from soil S, but not so strong as to cause tubing T to break.

The portion of frame 172 to which first roller 186 is secured can comprise two lower arms 184A and 184B as shown in FIG. 12B on either side 172A and 172B of frame 172, respectively. First roller 186 can be rotatably secured between lower arms 184A and 184B. First and second lower arms 184A and 184B can be an integral portion of frame 172 or can be separate structures that are attached to frame 172. First and second lower arms 184A and 184B can be stationary. As described above, first roller 186 can be configured to move up and down first and second lower arms 184A and 184B to adjust first roller 186 relative to the surface of the soil. In some embodiments, first and second lower arms 184A and 184B can rotate up and down to permit first roller 186 to be raised for travel and lowered for use, for example. In some embodiments, first and second lower arms 184A and 184B can comprise a portion of frame 172. In some embodiments, first and second lower arms 184A and 184B can comprise a portion of pivot frame 180.

Pivot frame 180 can comprise first and second upper arms 182A and 182B attached on sides 172A and 172B of frame 172, respectively. Second roller 188 can be positioned between first and second upper arms 182A and 182B. First and second upper arms 182A and 182B can pivot about pivot axis PA. Pivot axis PA can be positioned further toward a middle portion of frame 172. For example, pivot axis PA can be on frame 172 at a position that is inside of the position of first roller 186 such that pivot axis PA is in front of first roller 186 in the direction of travel A (see FIG. 12B) during use of the extractor. In such a position, first and second upper arms 182A and 182B can hold second roller 188 in a location outside of first roller 186 such that second roller 188 follows first roller 186 as seen from the direction of travel A during use. As shown in FIGS. 12A and 12B, for example, pivot axis PA of upper arms 182A and 182B of pivot frame 180 can be located on frame 172 inside of a position where lower arms 184A and 184B are attached to frame 172 such that pivot axis PA is in front of first roller 186 as seen from the direction of travel A during use with upper arms 182A and 182B holding second roller 188 in a location outside of first roller 186 such that second roller 188 follows first roller 186 as seen from the direction of travel A. Thus, the angle as measured from a plane (not shown) between first and second rollers 186, 188 and a plane (not shown) approximately parallel with a surface of soil S can be changed by rotating first and second upper arms 182A, 182B about pivot axis PA and thereby changing the position of second roller 188.

As shown in FIG. 12A, first and second upper arms 182A, 182B can have a length $L_{LA}$ that is longer than length $L_U$ of upper arm 132 (shown in FIG. 6A). In some embodiments, length $L_{LA}$ can be equal to or greater than about ⅓ of a length of sides 172A and 172B of frame 172. In some embodiments, length $L_{LA}$ can be equal to or greater than about ½ of a length of sides 172A and 172B of frame 172. In some embodiments, length $L_{LA}$ as shown in FIG. 12A can be equal to or greater than about 1.5 times of a length of lower arms 184A, 184B (which can be similar to length $L_L$ of lower arms 134 in FIGS. 6A-6C). In some embodiments, length $L_{LA}$ as shown in FIG. 12A can be equal to or greater than about 2 times of a length of lower arms 184A, 184B. To help stabilize first and second upper arms 182A, 182B, one or more support structures 194 (shown in dotted lines), such as bars or beams, can be secured between first and second upper arms 182A, 182B to connect arms 182A, 182B together.

Thus, pivot frame 180 can be pivotal at pivot axis PA to permit the angle as measured from a plane (not shown) between first and second rollers 186, 188 and a plane (not shown) approximately parallel with a surface of soil S to be variable. As pivot frame 180 is pivoted around pivot axis PA, first and second upper arms 182A, 182B can rotate in tandem such that as first and second upper arms 182A, 182B are rotated in a direction $U_1$ (see FIG. 12A), the angle can become larger. Alternatively, as first and second upper arms 182A, 182B are rotated in a direction $D_1$ (see FIG. 12A), the angle can become smaller or more acute. As explained above, first roller 186 can be adjustable up and down lower arms 184A, 184B in some embodiments. As with angle α, the distance between first roller 186 and a surface of soil S from which tubing T is being extracted can be determined based on at least one of a depth at which tubing T is buried in soil S, conditions of soil S, or a composition of soil S. For example, the evenness, or unevenness, of the surface of soil S can affect the selection of such a distance.

Figure 13A:
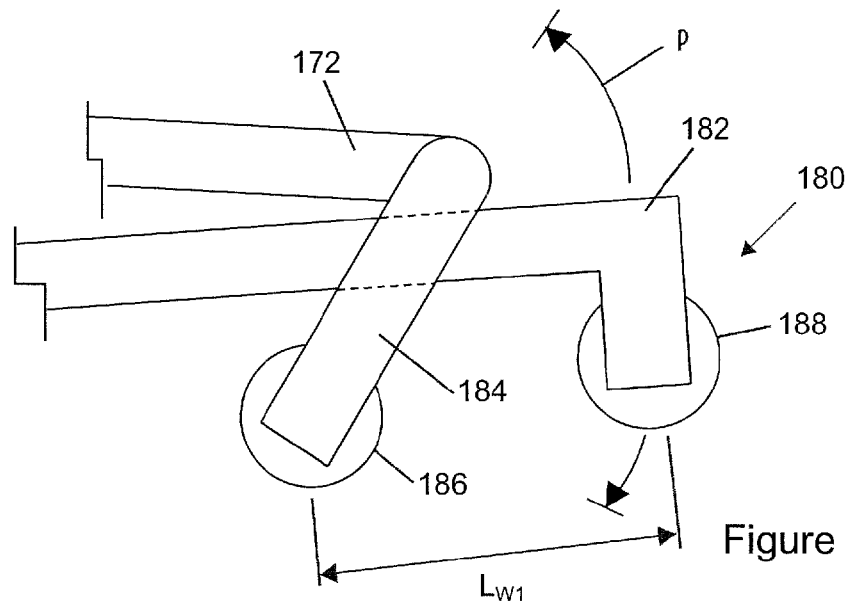
FIGS. 13A and 13B are schematic views illustrating a portion of the embodiment of the extractor according to FIGS. 12A and 12B.
Figure 13B:
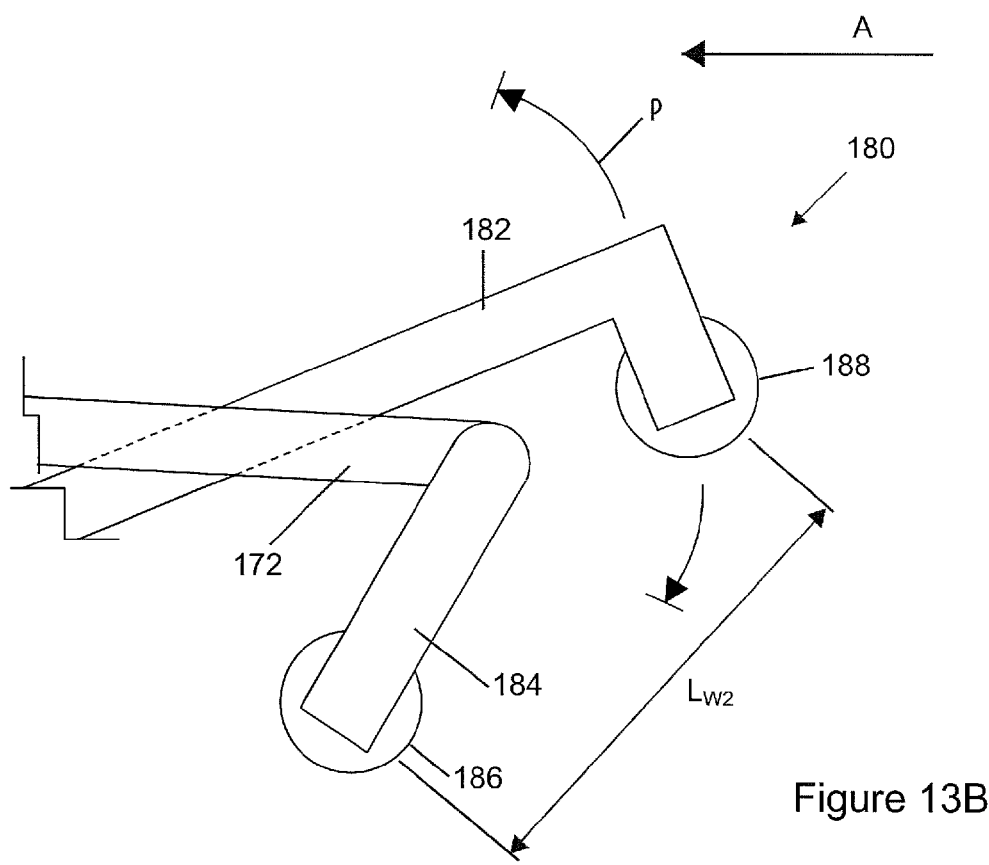
Figure 14:
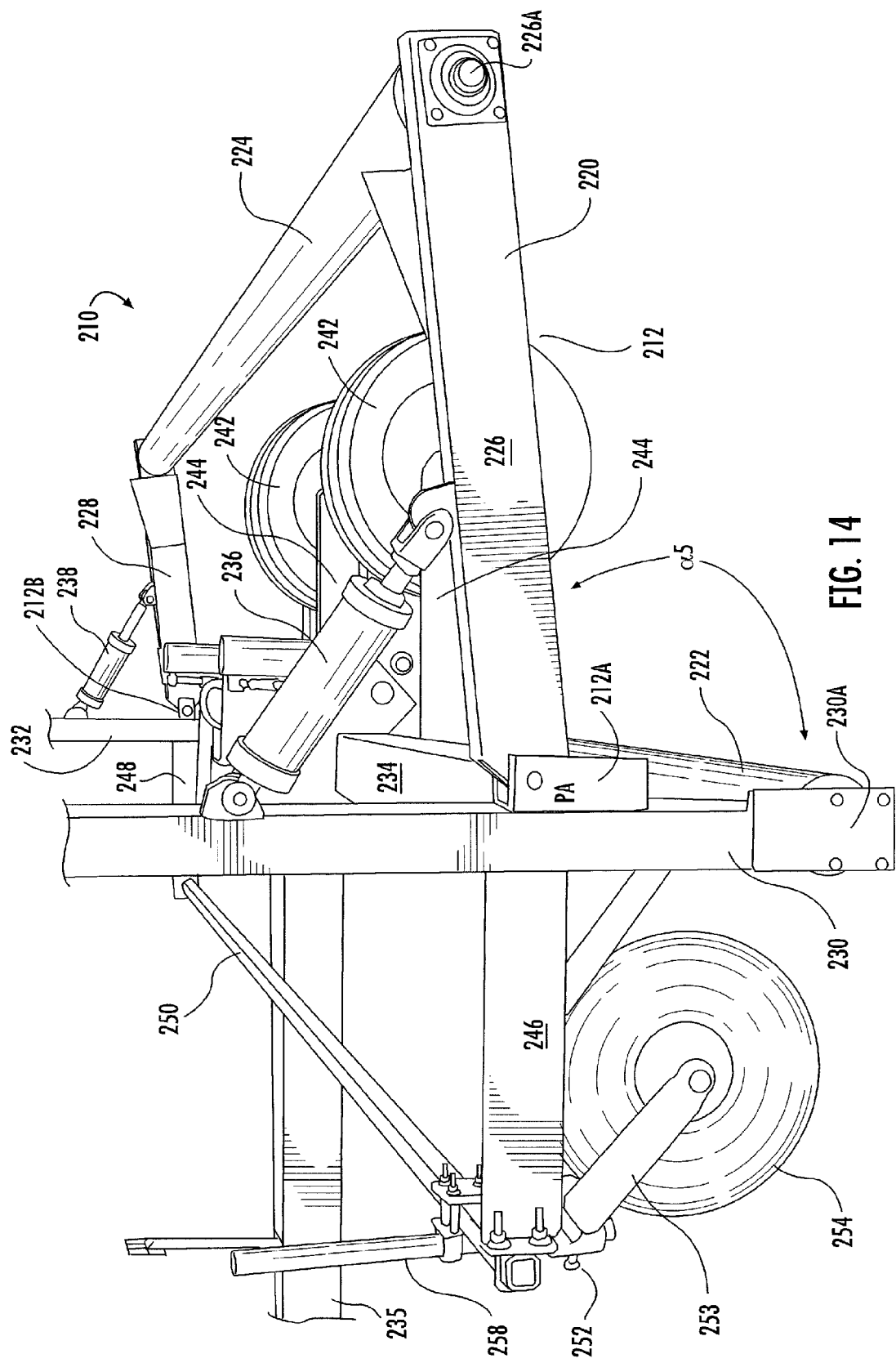
FIG. 14 is a side plan view of another embodiment of an extractor for removing agricultural tubing from soil of a field according to the subject matter disclosed herein.
Figure 15:
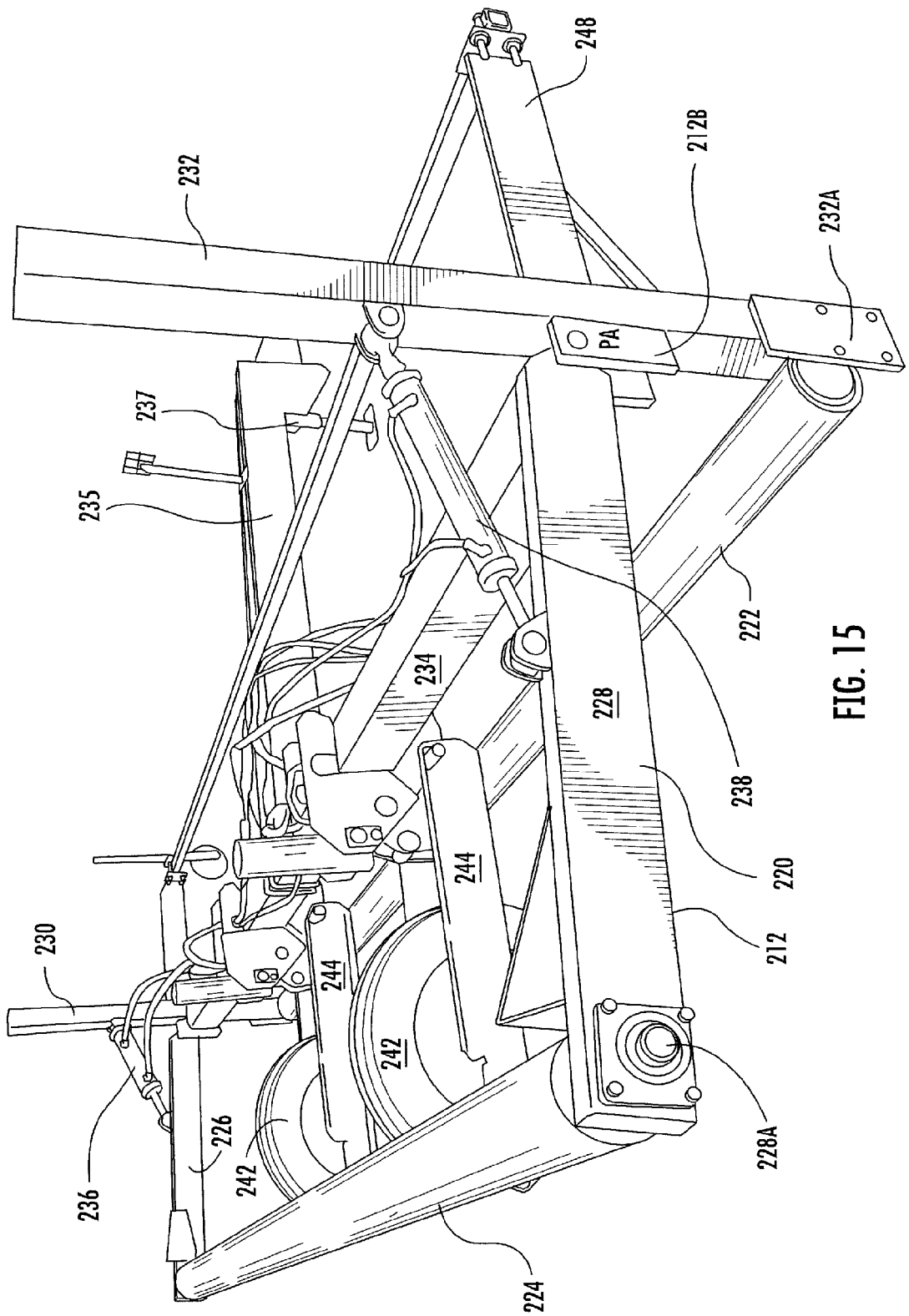
FIG. 15 is a side perspective view of the embodiment of the extractor for removing agricultural tubing from soil of a field according to FIG. 14.
Figure 16:
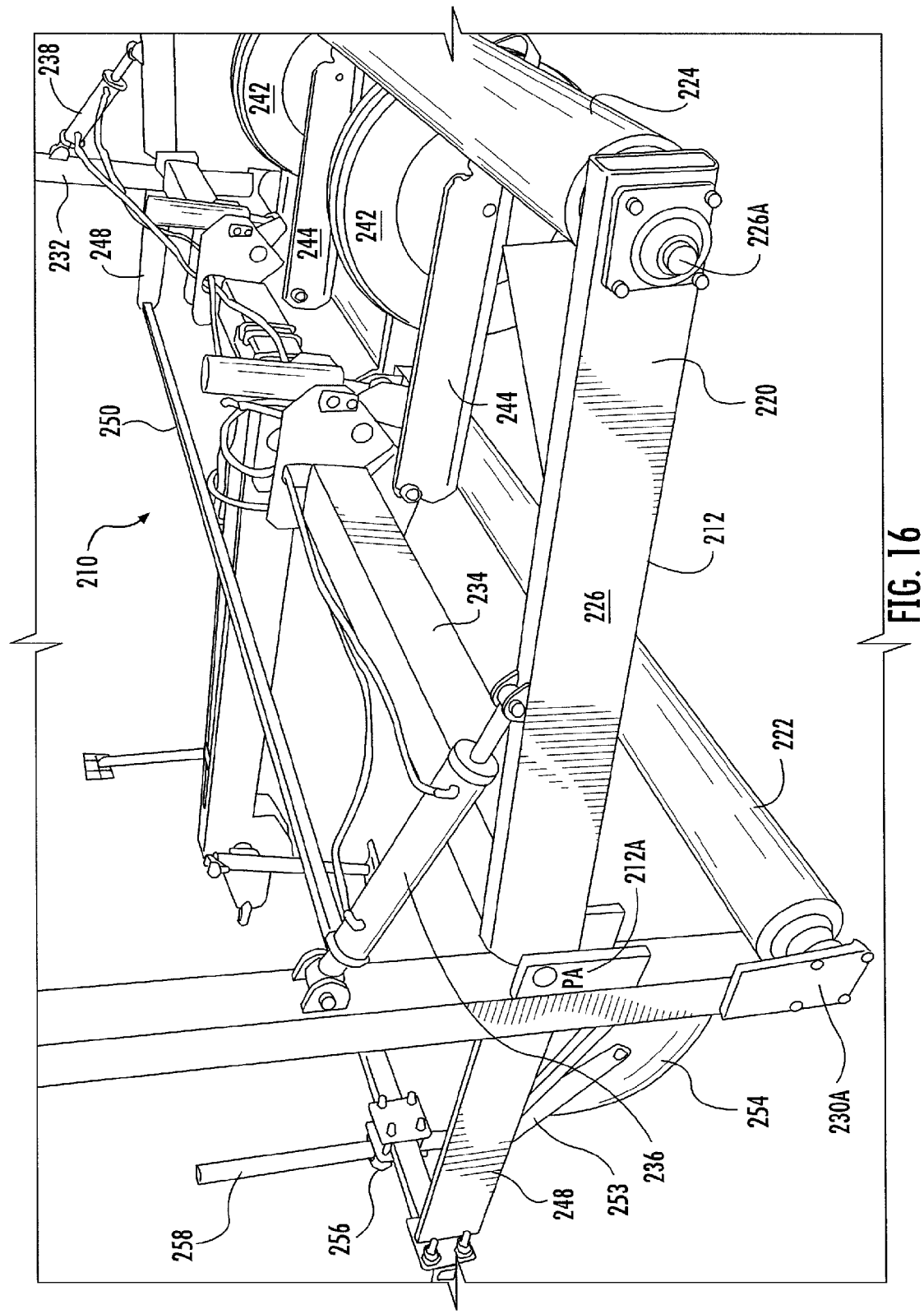
FIG. 16 is a side perspective view of the embodiment of the extractor for removing agricultural tubing from soil of a field according to FIG. 14, from the same side as FIG. 14 but from the opposite side as FIG. 15.
Figure 17:
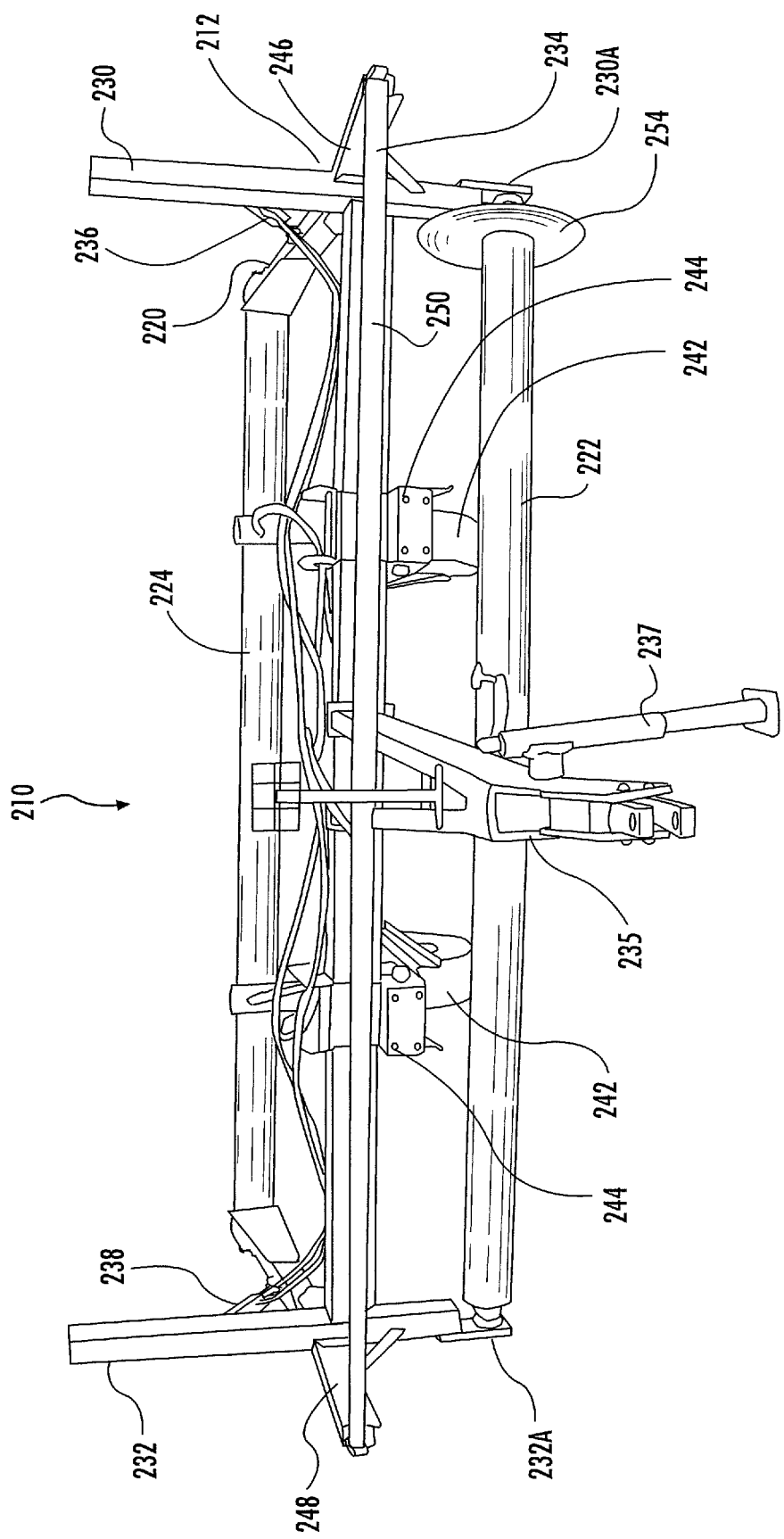
FIG. 17 is a front plan view the extractor for removing agricultural tubing from soil of a field according to FIG. 14.
Figure 18:
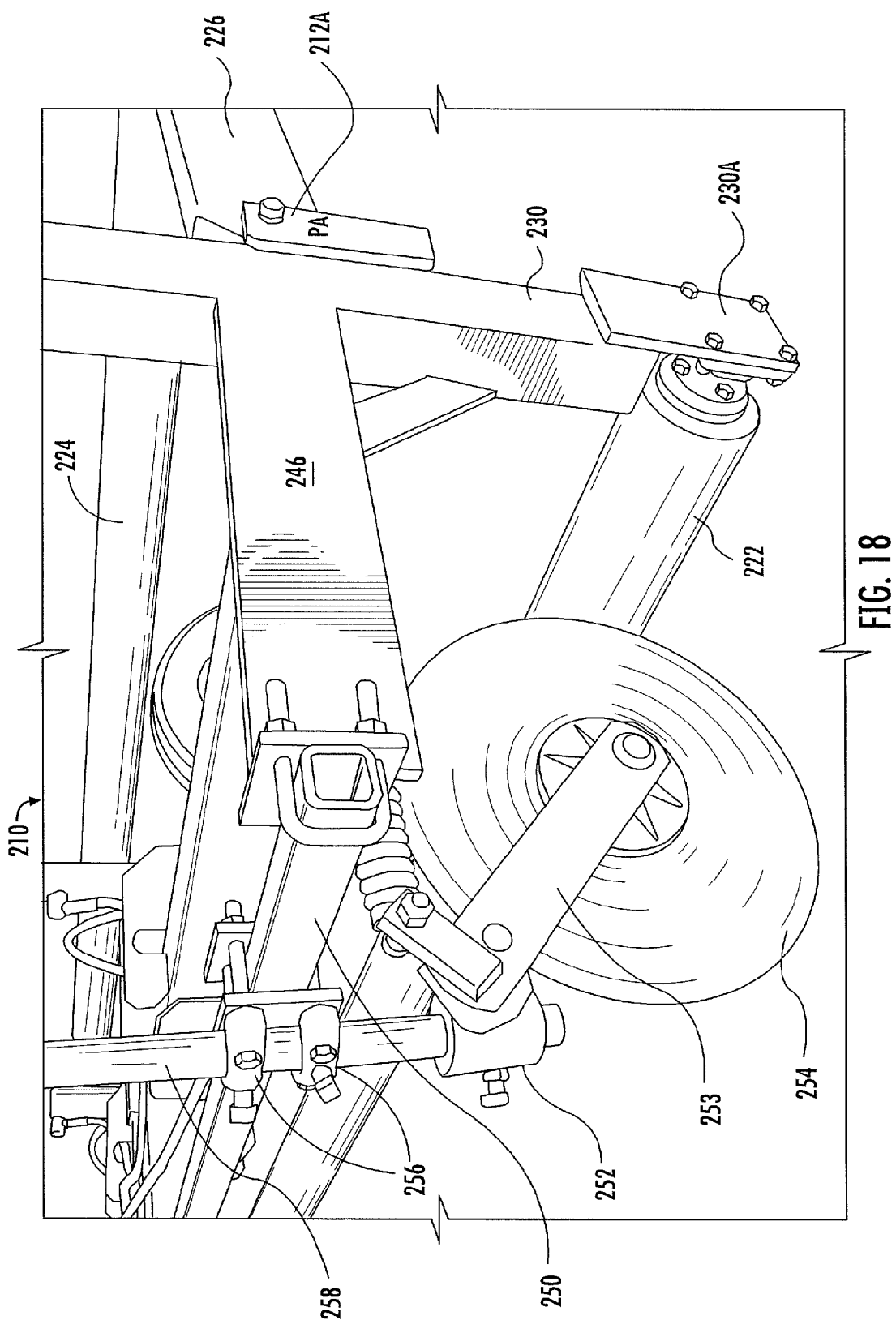
FIG. 18 is a side perspective view of a cutting disc of the embodiment of the extractor for removing agricultural tubing from soil of a field according to FIG. 14.

FIGS. 13A and 13B are schematic drawings of a portion of a pivot frame 180 of an embodiment of an extractor according to the disclosure herein. Pivot frame 180 can be secured or attached to frame 172 of an extractor and can comprise upper arms 182 and lower arms 184 (of which only one upper arm 182 and one lower arm 184 are shown) or can comprise upper arms 182 and not lower arms 184. A first roller 186 can be secured between lower arms 184 and a second roller 188 can be secured between upper arms 182. In some embodiments, as shown in FIGS. 13A and 13B where lower arms 184 are not a portion of pivot frame 180, lower arms 184 can be part of frame 172 of the extractor. In fact, lower arms 184 can be any shape or portion of frame 172 as long as that portion 184 places first roller 186 in the desired proximity to the surface of the soil from which tubing is to be extracted. In some embodiments, lower arms 184 can be considered a part of pivot frame 180. For example, lower arms 184 can be considered a separate part of pivot frame 180 or lower arms 184 can be connected to pivot frame 180 by some connecting structure running between upper arms 182 and lower arms 184.

Upper arms 182 can be long in length relative to lower arms 184 as shown in FIG. 12A. Upper arms 182 can rotate about a pivot axis (not shown in FIGS. 13A and 13B) that is further down upper arms 182, while lower arms 184 can remain stationary. As shown in FIGS. 13A and 13B, first roller 186 can be low to the ground and upper arms 182 can be long enough to extend over the top and past first roller 186. In this manner, upper arms 182 can be rotated along an arc p while still keeping second roller 188 above and behind first roller 186 as viewed in the direction of travel A. This range of rotation of upper arms 182 as shown in FIGS. 13A and 13B can provide a number of different angles of pivot frame 180 as measured from a plane (not shown in FIGS. 13A and 13B; see FIGS. 7A-7D) between first and second rollers 186, 188 and a plane (not shown in FIGS. 13A and 13B; see FIGS. 7A-7D) approximately parallel with a surface of the soil from which the tubing is being extracted. Further, such a range of rotation of upper arms 182 can also provide a smaller range of distances between first roller 186 and second roller 188 as compared to the embodiment shown in FIG. 6A-6C. As shown in FIGS. 13A and 13B, due to the length of upper arms 182, distance $L_{W1}$ can be closer in size to distance $L_{W2}$ than similarly angled rollers when the second roller is held between shorter upper arms, for example as shown in FIGS. 6A-6C.

Figure 7A:
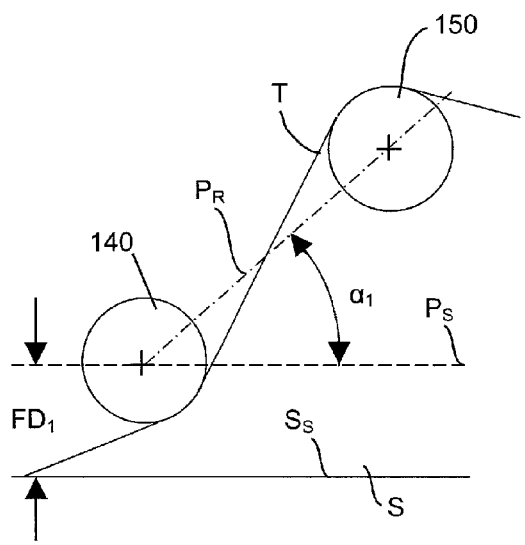
FIGS. 7A-7D are schematic views illustrating a portion of an embodiment of an extractor for removing agricultural tubing from soil of a field according to the subject matter disclosed herein.
Figure 7B:
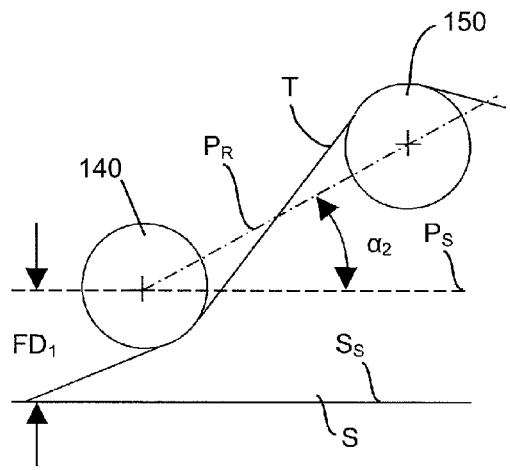

As further illustrated in FIGS. 7A-7B, a number of different angles of such pivot frames and first and second rollers can be achieved using each of the different embodiments of extractors and pivot frames as disclosure herein. Further, if desired, a number of different distances between the first roller and the soil can be achieved. As shown in the schematic drawings in FIGS. 7A-7D, the pivot frames of the extractors disclosed herein can move a second roller 150 and/or a first roller 140 to different positions relative one another and/or to the surface of the soil from which tubing is to be extracted to form a variety of angles of the pivot frame and first and second rollers that can increase the optimization of tension on tubing T being extracted for easier removal with less fear of breaking the tubing T. As shown in FIG. 7A, the arms of a pivot frame can be move to a position to form an angle $α_1$ as measured from plane $P_R$ between first and second rollers 140, 150 and plane $P_S$ approximately parallel with a surface $S_S$ of a soil S while a distance $FD_1$ between first roller 140 and surface $S_S$ of soil S can be set. As shown in FIG. 7B, the arms of a pivot frame can be move to a position to form a more acute angle $α_2$ as measured from plane $P_R$ between first and second rollers 140, 150 and plane $P_S$ approximately parallel with a surface $S_S$ of a soil S while distance $FD_1$ between first roller 140 and surface $S_S$ of soil S can be maintained.

Figure 7C:
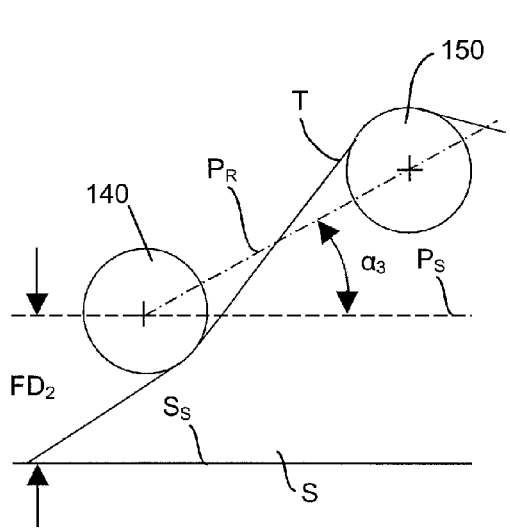
Figure 7D:
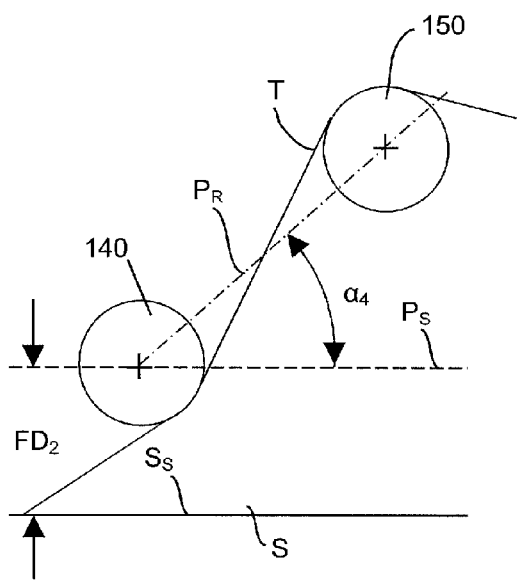

Similarly, in FIG. 7C, the arms of a pivot frame can be move to a position to form an angle $α_3$ as measured from plane $P_R$ between first and second rollers 140, 150 and plane $P_S$ approximately parallel with a surface $S_S$ of a soil S while a different distance $FD_2$ between first roller 140 and surface $S_S$ of soil S can be set. As shown in FIG. 7D, the arms of a pivot frame can be move to a position to form a wider acute angle $α_4$ as measured from plane $P_R$ between first and second rollers 140, 150 and plane $P_S$ approximately parallel with a surface $S_S$ of a soil S while distance $FD_2$ between first roller 140 and surface $S_S$ of soil S can be maintained.

Angles $\alpha_1$, $\alpha_2$, $\alpha_3$, $\alpha_4$ can be determined based on at least one of a depth at which tubing T is buried in soil S, conditions of soil S, or a composition of soil S. Angles $\alpha_1$, $\alpha_2$, $\alpha_3$, $\alpha_4$ can range, for example, between approximately 20° and approximately 85°. In some embodiments, angles $\alpha_1$, $\alpha_2$, $\alpha_3$, $\alpha_4$ can range, for example, between approximately 40° and approximately 70°. For example, angle $\alpha_4$ can be set at greater than approximately 45°, while angle $\alpha_1$ can be set at approximately 45°.

Similarly, distances $FD_1$, $FD_2$ can also be determined based on at least one of a depth at which tubing T is buried in soil S, conditions of soil S, or a composition of soil S. For example, the range of distance $FD_1$, $FD_2$ can be from generally just above surface $S_S$ of a soil S to about 10 inches or more as measure from a mean or median soil level to a center point of first roller 140. For example, in some embodiments, the range of distance $FD_1$, $FD_2$ can be between about 2 inches and about 10 inches. In some embodiments, the distance $FD_1$, $FD_2$ can be about 2 inches, about 3 inches, about 4 inches, about 5 inches, about 6 inches, about 7 inches, about 8 inches, about 9 inches or about 10 inches. In some embodiments, distance $FD_1$, $FD_2$ can be up to approximately 15 inches. In some embodiments of the extractors disclosed herein, distances $FD_1$, $FD_2$ between surface $S_S$ of soil S and first roller 140 can be adjustable by pivoting the pivot frame about the pivot axis. In some embodiments, distance $FD_1$, $FD_2$ between surface $S_S$ of soil S and first roller 140 can be adjustable by moving first roller 140 between an end of the pivot frame and the pivot axis along the pivot frame.

Figure 8:
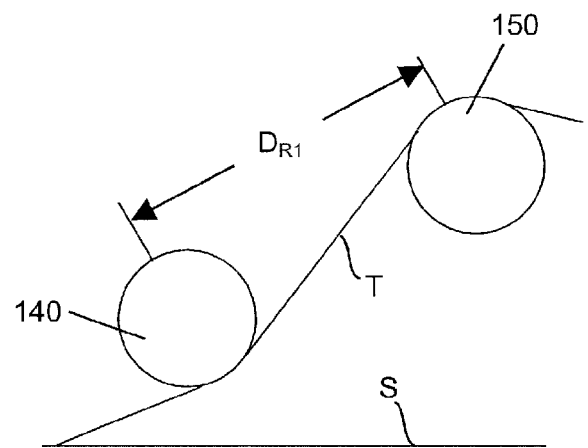
FIG. 8 is a schematic view illustrating a portion of an embodiment of an extractor for removing agricultural tubing from soil of a field according to the subject matter disclosed herein.
Figure 9A:
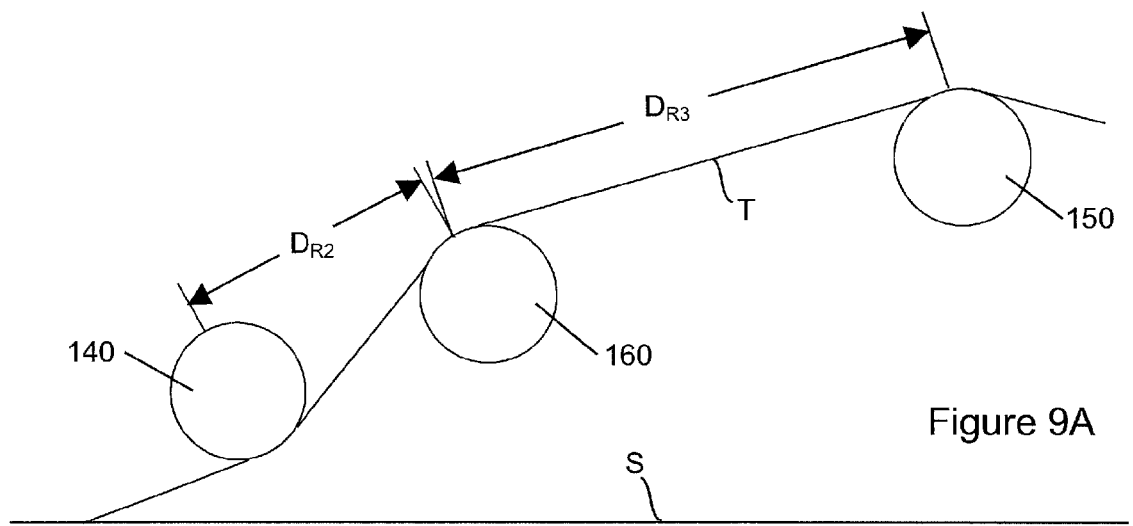
FIGS. 9A and 9B are schematic views illustrating a portion of an embodiment of an extractor for removing agricultural tubing from soil of a field according to the subject matter disclosed herein.
Figure 9B:
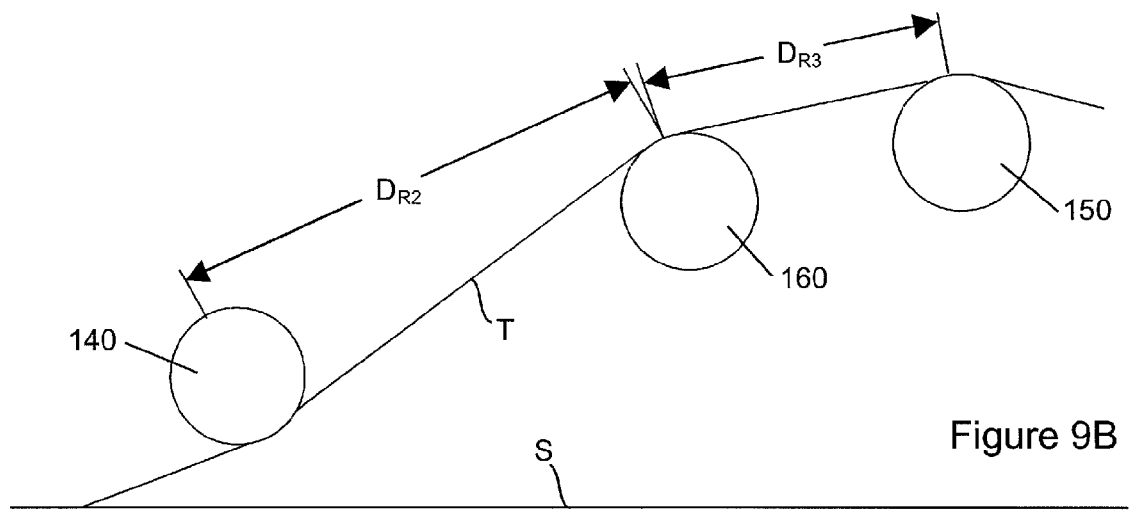

Additionally, using the different embodiments of extractors and pivot frames as disclosure herein, a number of different distances between respective rollers can be achieved, if desired. As shown in FIG. 8, depending on the embodiment of the extractor and pivot frame used, a distance $D_{R1}$ between first roller 140 and second roller 150 can be changed. Similarly, as shown in FIGS. 9A and 9B, a third roller 160 can be secured to a pivot frame between first and second rollers 140, 150. First, second and third rollers 140, 150, 160 can be positioned relative to one another on a pivot frame so that tubing T to be extracted from soil S can be threadable under first roller 140 and over third and second rollers 160, 150 in an s-curve with tubing T being approximately linear between third roller 160 and second roller 150. Depending on the embodiment of the extractor and pivot frame used, a distance $D_{R2}$ between first roller 140 and second roller 150 can be changed and/or a distance $D_{R3}$ between third roller 160 and second roller 150 can be changed. Thus, third roller 160 can be adjustable along a pivot frame between first roller 140 and second roller 150 to adjust at least one of a distance $D_{R2}$ between first roller 140 and third roller 150 or a distance $D_{R3}$ between second roller 150 and third roller 160. Distances $D_{R1}$, $D_{R2}$, $D_{R3}$ can also be determined based on at least one of a depth at which tubing T is buried in soil S, conditions of soil S, or a composition of soil S. The range of movement for distances $D_{R1}$, $D_{R2}$, $D_{R3}$ can vary depending on the diameter of the rollers and the range of adjustability. The diameter of roller 140, 150, 160 can vary. For example, as stated above, the diameter can be about 4 inches or greater. In some embodiments, the diameter can be about 6 inches or greater. In some embodiments, the diameter can be about 8 inches or greater. In some embodiments, the diameter can be between about 4 inches and about 10 inches. In some embodiments, the diameter can be between about 6 inches and about 8 inches.

Figure 10:
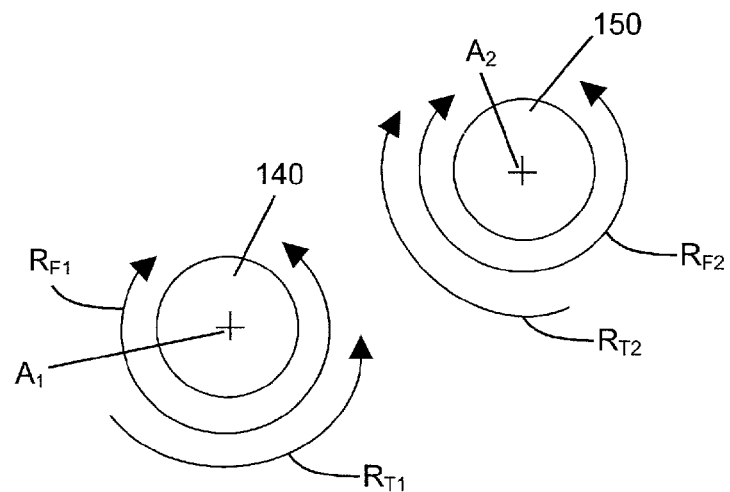
FIG. 10 is a schematic view illustrating a portion of an embodiment of an extractor for removing agricultural tubing from soil of a field according to the subject matter disclosed herein.
Figure 11:
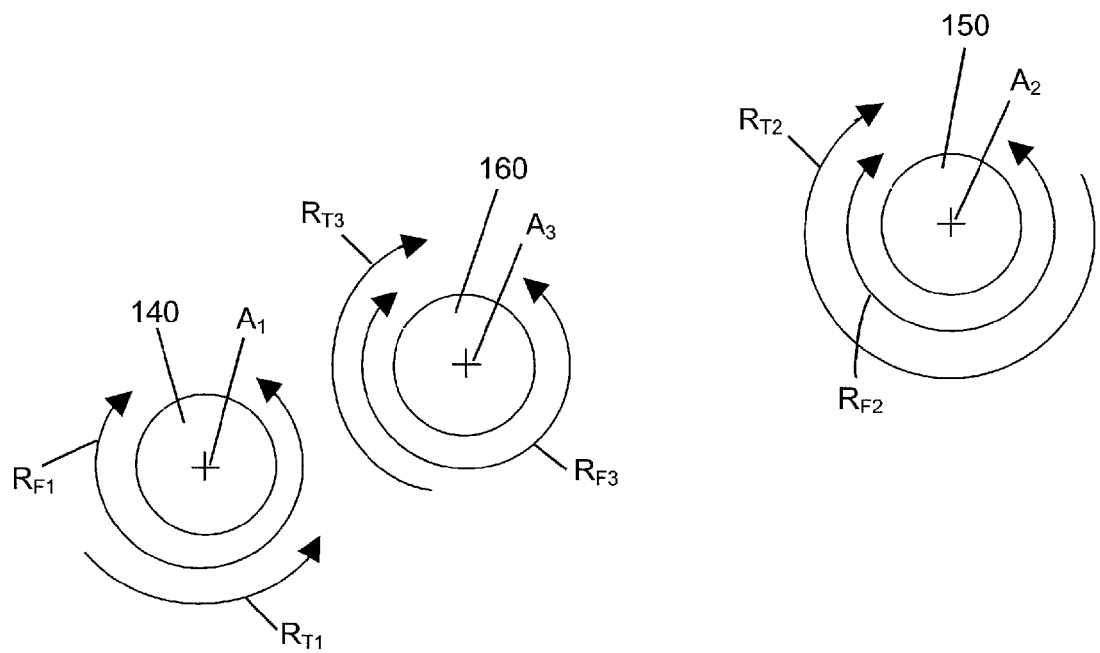
FIG. 11 is a schematic view illustrating a portion of an embodiment of an extractor for removing agricultural tubing from soil of a field according to the subject matter disclosed herein.

Referring to FIGS. 10 and 11, schematic drawings are provided to show the possible rotation of rollers 140, 150, 160 that can be used in some embodiments of extractors as disclosed herein. As shown in FIG. 10, in embodiments using two rollers, first roller 140 can have a free rotation $R_{F1}$ to allow it to freely rotate about an axis $A_1$ and second roller 150 can have a free rotation $R_{F2}$ to allow it to freely rotate about an axis $A_2$. The free rotation helps to distribute forces across the circumferences of first and second rollers 140, 150 as first and second rollers 140, 150 pull the tubing from the soil of the ground as the extractor moves across the field.

When a tubing is being extracted from a soil with the tubing threaded under first roller 140, first roller 140 can rotate in a direction $R_{T1}$. With the tubing threaded over second roller 150, second roller 150 can rotate in an opposite direction $R_{T2}$. As shown in FIG. 11, in embodiments using three rollers, first roller 140 can have a free rotation $R_{F1}$ to allow it to freely rotate about an axis $A_1$; second roller 150 can have a free rotation $R_{F2}$ to allow it to freely rotate about an axis $A_2$; and third roller 160 can have a free rotation $R_{F3}$ to allow it to freely rotate about an axis $A_3$. When a tubing is being extracted from a soil with the tubing threaded under first roller 140, first roller 140 can rotate in a direction $R_{T1}$. With the tubing threaded over third roller 160 and second roller 150, third roller 160 can rotate in a direction $R_{T3}$ that is opposite of direction $R_{T1}$, while second roller 150 can rotate in a direction $R_{T2}$ that is the in the same rotational direction as direction $R_{T3}$ and opposite of rotational direction $R_{T1}$.

Referring now to FIGS. 14 through 21, yet another embodiment of the extractor according to the presently disclosed subject matter is provided, and is generally referred to at 210. Extractor 210 includes a pivot frame 220 disposed on frame 212. Pivot frame 220 can include a pivot axis PA around which at least a portion of pivot frame 220 can be pivoted. A first roller 222 can be secured to frame 212 by securing first roller 222 to pivot frame 220 on a first side of pivot axis PA. A second roller 224 can be secured to pivot frame 220 on a second side of the pivot axis PA. At least a portion of pivot frame 220 can be positioned at an angle such that first roller 222 is positioned closer to soil S (seen in FIG. 21) than second roller 224.

Continuing with particular reference to FIGS. 14-17, frame 212 can comprise a first side that includes a side frame 212A and a second side that includes a side frame 212B. Further, pivot frame 220 can comprise a first arm 226 attached to the first side frame 212A at post 230 and a second side arm 228 attached to the second side frame 212B at post 232, creating pivot axis PA among the first and second arms 226, 228 and posts 230, 232. In such embodiments, first roller 222 can be positioned between posts 230 and 232 at mounting points 230A and 232A below pivot axis PA and second roller 224 can be positioned between first arm 226 and second arm 228 at mounting points 226A and 228A above pivot axis PA. Cross member 234 connects posts 230 and 232, and a hitch 235 extends towards the front of extractor 210 for use in attached extractor 210 to a tractor or the like. Hitch stand 237 is mounted to hitch and can facilitate storage of extractor 210. Pivot frame 220 is pivotal at pivot axis PA to permit the angle of pivot frame 220 formed by the position of roller 224 to be variable. Particularly, roller 224 is mounted within pivot frame 220 to be pivotable across approximately 90 degrees, or slightly larger, at pivot axis PA, while roller 222 remains stationary. That is, second roller 224 is movable with respect to first roller 222 at an angle $\alpha 5$ that ranges from 90 degrees to 0 degrees. This range of motion is facilitated by first control arm 236 and second control arm 238 which are mounted at either end of frame 212 between posts 230 and 232 and first and second arms 226, 228. Control arms 236 and 238 can be hydraulic, and can be positioned above frame 212 to allow movement of second roller 224 downwardly and upwardly a starting position at approximately 90 degrees, or slightly larger, with respect to posts 230 and 232, towards roller 222. Extractor 210 can further comprise wheels 242, mounted to frame 212 via wheel assemblies 244. Arms 226 and 228 extend such that second roller 224 does not rest on top of wheels 242 but rather extends past wheels 242 so that second roller 224 can move from substantially 90 degrees, or slightly larger, and down towards bottom roller 222 past wheels 242. In extractor 210 rollers 222 and 224 can be freely rotatable and/or can be operated by a hydraulic drive or other suitable power drive in accordance with approaches described elsewhere herein with respect to other embodiments of the presently disclosed extractor.

Figure 19B:
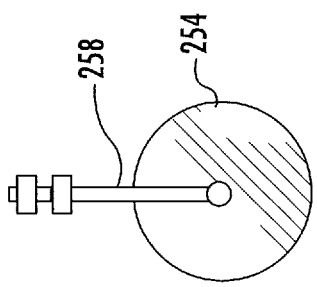
FIG. 19B is a side view of an embodiment of a cutting disc according to FIG. 19A.
Figure 19D:
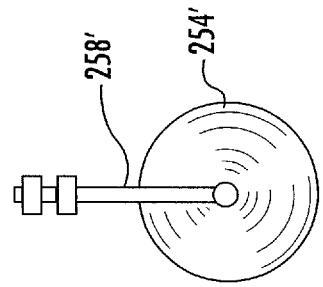
FIG. 19D is a side view of an embodiment of a cutting disc according to FIG. 19C.
Figure 19A:
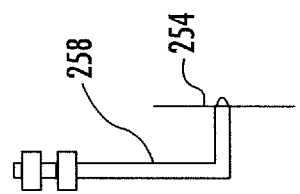
FIG. 19A is a front view of an embodiment of a cutting disc of the extractor for removing agricultural tubing from soil of a field according to FIG. 14.
Figure 19C:
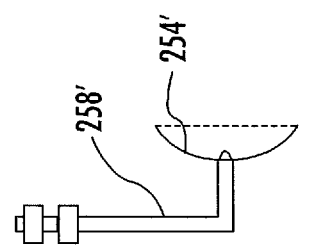
FIG. 19C is a front view of another embodiment of a cutting disc of the extractor for removing agricultural tubing from soil of a field according to FIG. 14.
Figure 20:
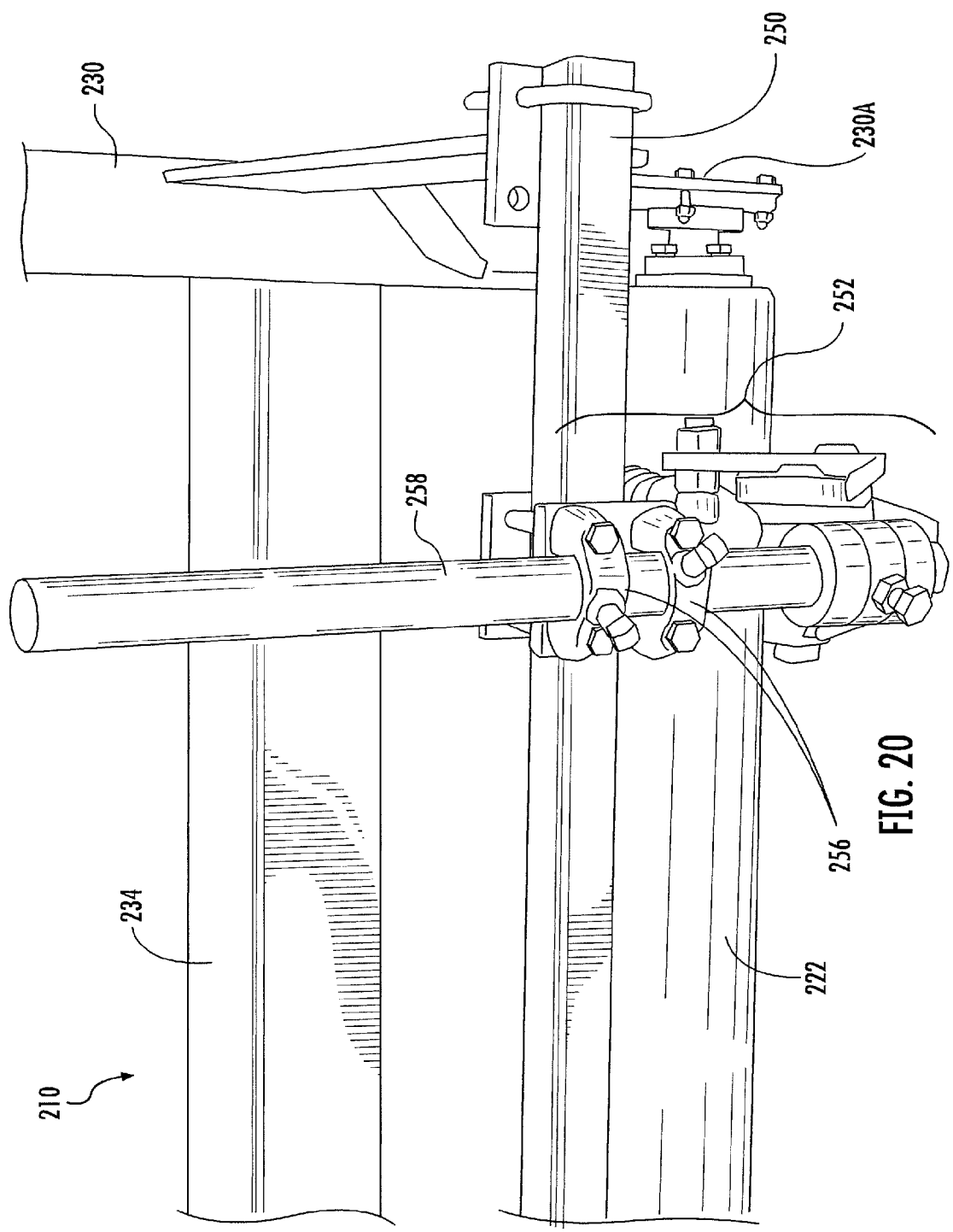
FIG. 20 is a front plan view of a disc assembly of the extractor for removing agricultural tubing from soil of a field according to FIG. 14.

Referring particularly to FIGS. 14, 16, 18, 19A-19D and 20, frame 212 of extractor 210 can further comprise front arms 246 and 248, which extend from posts 230 and 232 toward the front of extractor 210, and a front cross member 250 that connects arms 246 and 248, via any suitable connection, such as by weld, u-bolt and bracket, and the like. Rotary discs 254 are mounted to frame 212 via disc assembly 252 mounted to cross member 250. Disc assembly 252 can comprise a series of brackets 253, clamps 256 and a mounting post 258 such that the height of discs 254 can be adjusted and so that the placement of discs 254 can be adjusted laterally along cross member 250 to accommodate rows of drip tape that might be present in an area of ground or soil wherein it is desired to extract the drip tape. Optionally, rotary discs 254 can be rotatably mounted to mounting post 258. Rotary discs 254 can be provided in any suitable or desired configuration, such as a straight cutting disc or as a cone-shaped cutting disc. Referring to FIGS. 19A and 19B, a straight cutting disc 254 is substantially parallel to mounting post 258 when seen from the front of extractor 210. Referring to FIGS. 19C and 19D, a cone-shaped disc 254' is concave with respect to mounting post 258' when seen from the front of extractor 210. In some embodiments, a cone-shaped disc can disturb the earth more effectively than a straight cutting disc, thus facilitating removal of drip tape.

Figure 21:
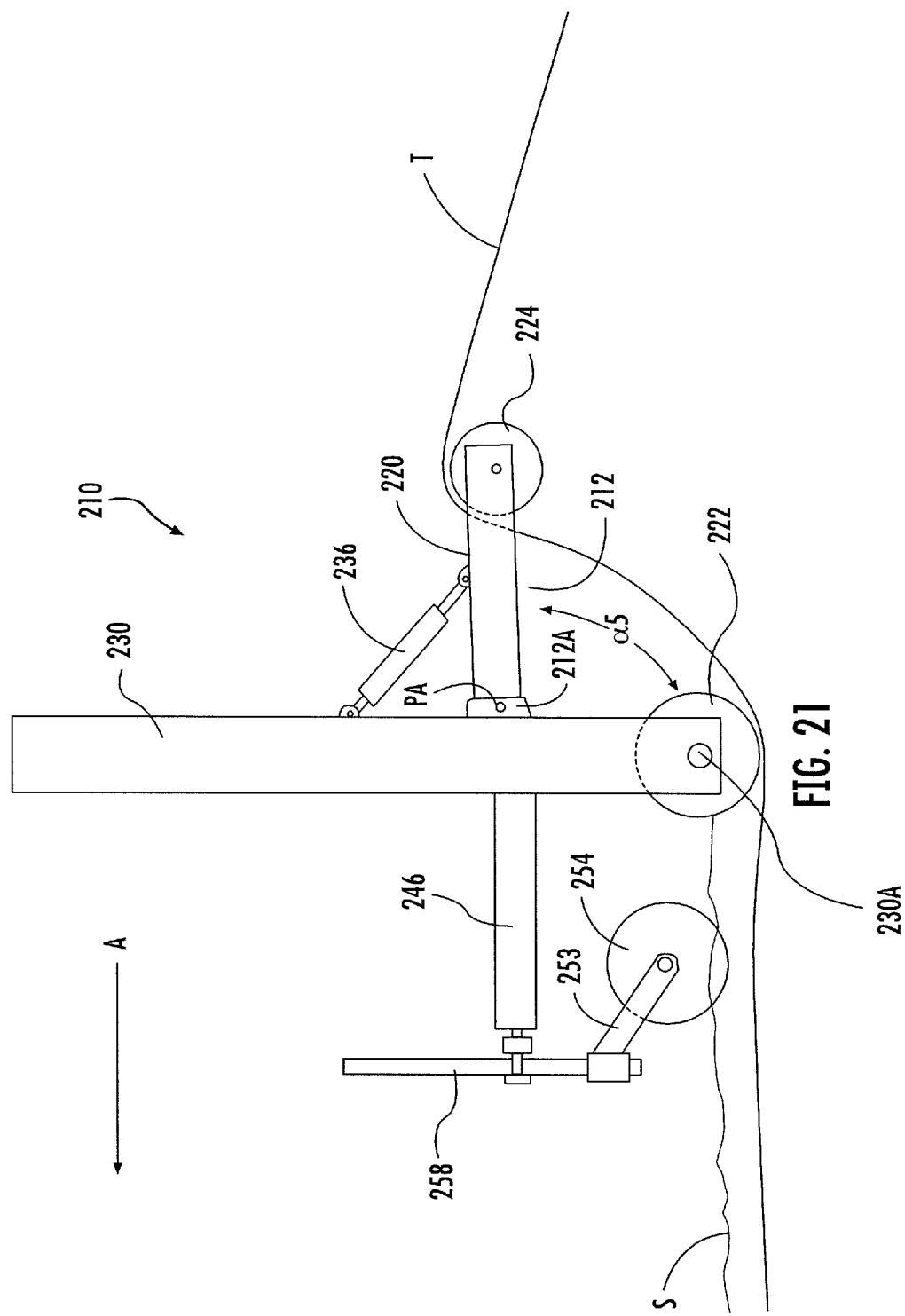
FIG. 21 is a schematic view of the extractor for removing agricultural tubing from soil of a field according to FIG. 14 when in use to remove drip tape.

Referring particularly to FIG. 21, extractor 210 is presented wherein second or upper roller 224 is presented at a 90 degree angle (or slightly larger) α5 with respect to first or lower roller 222 via controller arm 236. Tubing T proceeds under lower roller 222 and over upper roller 224 during extraction in accordance with other embodiments disclosed herein. Extraction occurs as extractor 210 proceeds in direction A of extractor 210 when mounted such as, for example, behind a tractor. Disc 254 breaks up soil S to facilitate removal of tubing T. As with angle α5, the distance between first roller 222 and a surface of soil S from which tubing T is being extracted can be determined based on at least one of a depth at which tubing T is buried in soil S, conditions of soil S, or a composition of soil S. For example, the evenness, or unevenness, of the surface of soil S can affect the selection of such a distance.

In some embodiments of the extractor according to the present subject matter, first/lower rollers and/or second/upper rollers can be power driven. For example, in some embodiments, the first/lower roller and/or the second/upper roller can be driven by a motor, a hydraulic drive, and/or the like, so that the rollers rotate. For instance, the first/lower roller and/or the second/upper roller can be belt-driven or chain-driven. In some embodiments, the first/lower roller and/or the second/upper roller can be driven by a wheel or wheels of a frame, or carriage, of the extractor. For example, the wheels can be located in a rear position on the frame and the second/upper roller can be lowered to come into contact with one or both rearward wheels to drivingly rotate the second/upper roller as the wheels rotate during the movement of the extractor across a field. Other types of power driven first/lower or second/upper rollers are also contemplated.

An extractor in accordance with the presently disclosed subject matter can be provided with any desired width, and width is typically established according to the field installation where tubing will be removed. For example, in one embodiment the extractor can be provided at a width that can make the extractor more transportable through gates and other possible obstructions near a field installation of tubing to be extracted. However, it is not desired to be limited by to any particular widths. Rather, again, the width of the apparatus can be provided in accordance with a desired field installation from which tubing is to be removed.

Embodiments of the present disclosure shown in the drawings and described above are exemplary of numerous embodiments that can be made within the scope of the appended claims. It is contemplated that the configurations of the extractors for removing agricultural tubing from soil of a field and related methods can comprise numerous configurations other than those specifically disclosed herein.

What is claimed is:

1. An extractor for removing agricultural tubing from a soil of a field, the extractor comprising:
   a frame, wherein the frame comprises at least one wheel and a hitch to permit the frame to be pulled by a vehicle;
   a pivot frame disposed on the frame, the pivot frame having a pivot axis around which at least a portion of the pivot frame is pivotal;
   a first roller secured to the pivot frame on a first side of the pivot axis; and
   a second roller secured to the pivot frame on a second side of the pivot axis, wherein the second side of the pivot axis is opposite to the first side of the pivot axis, so that the second roller is movable by pivoting the pivot frame about the pivot axis to form an angle as measured from a plane between the first and second rollers and a plane approximately parallel with a surface of the soil with the first roller positioned closer to the soil than the second roller so that a tubing to be extracted is threadable under the first roller and over the second roller, and wherein the first roller is in front of the second roller relative to the direction of travel of the extractor.

2. The extractor according to claim 1, wherein the frame comprises a top surface and a bottom surface, the first roller being positionable below the bottom surface of the frame and the second roller being positionable above the top surface of the frame.

3. The extractor according to claim 1, further comprising a locking element that is engageable with the pivot frame to lock the pivot frame at different angles with the first roller positioned closer to the soil than the second roller.

4. The extractor according to claim 1, wherein the angle as measured from a plane between the first and second rollers and a plane approximately parallel with a surface of the soil is determined based on at least one of a depth at which the tubing is buried in the soil, conditions of the soil, or a composition of the soil.

5. The extractor according to claim 1, wherein the angle as measured from a plane between the first and second rollers and a plane approximately parallel with a surface of the soil is approximately 45°.

6. The extractor according to claim 1, wherein the angle as measured from a plane between the first and second rollers and a plane approximately parallel with a surface of the soil is greater than approximately 45°.

7. The extractor according to claim 1, wherein the frame comprises a first side and a second side and the pivot frame comprises a first arm attached to the first side of the frame and a second arm attached to the second side of the frame creating the pivot axis among the first and second arms and the frame.

8. The extractor according to claim 1, further comprising a controller for pivoting the pivot frame about the pivot axis.

9. The extractor according to claim 1, wherein the first roller is positioned in the pivot frame and at least one of the first and second rollers are adjustable along the pivot frame relative to the pivot axis.

10. The extractor according to claim 1, wherein the second roller is adjustable along the pivot frame relative to the pivot axis to adjust a distance between the first roller and the second roller.

11. The extractor according to claim 1, further comprising a third roller positionable within the frame between the first and second rollers.

12. The extractor according to claim 11, wherein the first, second and third rollers are positioned relative to one another so that a tubing to be extracted is threadable under the first roller and over the third and second rollers in an s-curve with the tubing being approximately linear between the third roller and the second roller.

13. The extractor according to claim 11, wherein the third roller is positioned in and is adjustable along the pivot frame between the first roller and the second roller to adjust at least one of a distance between the first roller and the third roller or a distance between the second roller and the third roller.

14. The extractor according to claim 1, wherein a distance between the soil and the first roller is adjustable.

15. The extractor according to claim 14, wherein the first roller is positioned in the pivot frame and the distance between the soil and the first roller is adjustable by pivoting the pivot frame about the pivot axis.

16. The extractor according to claim 14, wherein the first roller is positioned in the pivot frame and the distance between the soil and the first roller is adjustable by moving the first roller between an end of the pivot frame and the pivot axis.

17. The extractor according to claim 1, wherein the first and second rollers are a length that permits multiple rows of agricultural tubing to be pulled from the soil.

18. The extractor according to claim 1, wherein the tubing to be extracted is threadable under the first roller and over the second roller in an s-curve.

19. The extractor according to claim 1, wherein the first and second rollers are free spooling.

20. A method of extracting agricultural tubing from a soil of a field, the method comprising:
providing an extractor comprising:
a frame;
a pivot frame disposed on the frame, the pivot frame and the frame creating a pivot axis around which the pivot frame is pivotal;
a first roller secured to the pivot frame on a first side of the pivot axis; and
a second roller secured to the pivot frame on a second side of the pivot axis and so that the second roller is movable by pivoting the pivot frame about the pivot axis, wherein the second side of the pivot axis is opposite to the first side of the pivot axis;
positioning at least a portion of the pivot frame to form an angle as measured from a plane between the first and second rollers and a plane approximately parallel with a surface of the soil with the first roller positioned closer to the soil than the second roller and wherein the first roller is in front of the second roller relative to the direction of travel of the extractor;
threading a tubing to be extracted under the first roller and over the second roller;
moving the extractor over the soil from which the tubing is to be removed; and
pulling the tubing from the soil with the tubing moving under the first roller and over the second roller as the extractor moves over the field.

21. The method according to claim 20, wherein the step of positioning the pivot frame of the extractor comprises positioning the second roller above a top surface of the frame of the extractor with the first roller below a bottom surface of the frame of the extractor.

22. The method according to claim 20, wherein the frame comprises a wheel and a hitch and the step of moving the extractor comprises pulling the extractor with a vehicle.

23. The method according to claim 20, further comprising locking the pivot frame at different angles with the first roller positioned closer to the soil than the second roller depending upon at least one of a depth at which the tubing is buried in the soil, conditions of the soil, or a composition of the soil.

24. The method according to claim 20, further comprising determining the angle as measured from a plane between the first and second rollers and a plane approximately parallel with a surface of the soil based on at least one of a depth at which the tubing is buried in the soil, conditions of the soil, or a composition of the soil.

25. The method according to claim 24, wherein the angle is approximately 45°.

26. The method according to claim 24, wherein the angle is greater than approximately 45°.

27. The method according to claim 20, further comprising adjusting at least one of the first roller or the second roller along the pivot frame relative to the pivot axis.

28. The method according to claim 20, further comprising adjusting the second roller along the pivot frame relative to the pivot axis to adjust a distance between the first roller and the second roller.

29. The method according to claim 20, further comprising securing a third roller in the frame between the first and second rollers.

30. The method according to claim 29, wherein the step of threading comprises threading the tubing to be extracted under the first roller and over the third and second rollers in an s-curve with the tubing being approximately linear between the third roller and the second roller.

31. The method according to claim 30, further comprising adjusting the third roller between the first roller and the second roller to adjust at least one of a distance between the first roller and the third roller or a distance between the second roller and the third roller.

32. The method according to claim 20, further comprising adjusting a distance between the surface of the soil and the first roller.

33. The method according to claim 32, wherein the step of adjusting comprises pivoting the pivot frame about the pivot axis to adjust the distance between the surface of the soil and the first roller.

34. The method according to claim 32, wherein the first roller is positioned in the pivot frame and the step of adjusting comprises moving the first roller between an end of the pivot frame and the pivot axis to adjust the distance between the surface of the soil and the first roller.

35. The method according to claim 20, wherein the step of threading comprises threading multiple rows of agricultural tubing to be pulled from the soil around the first and second rollers.

36. The method according to claim 20, further comprising securing in a stationary position an exposed end of the tubing that has been threaded around the first and second rollers.

37. The method according to claim 36, wherein the first and second rollers are free spooling and further comprising distributing forces across circumferences of the first and second rollers as the first and second rollers pull the tubing from the soil as the extractor moves over the field.

38. The method according to claim 20, wherein the step of threading comprises threading a tubing to be extracted under the first roller and over the second roller in an s-curve.

39. The method according to claim 20, further comprising controlling the pivoting of the pivot frame about the pivot axis with a controller.

* * * * *